10/20/87 AU 254 OR 4,701,026

United States Patent [19]
Yazaki et al.

[11] Patent Number: 4,701,026
[45] Date of Patent: Oct. 20, 1987

[54] METHOD AND CIRCUITS FOR DRIVING A LIQUID CRYSTAL DISPLAY DEVICE

[75] Inventors: Minoru Yazaki; Yuzuru Sato, both of Suwa, Japan

[73] Assignee: Seiko Epson Kabushiki Kaisha, Tokyo, Japan

[21] Appl. No.: 743,531

[22] Filed: Jun. 11, 1985

[30] Foreign Application Priority Data

Jun. 11, 1984 [JP] Japan ............................. 59-119680
Aug. 27, 1984 [JP] Japan ............................. 59-177818

[51] Int. Cl.[4] ............................. G02F 1/13
[52] U.S. Cl. ............................. 350/333; 350/350 S
[58] Field of Search ............................. 350/350 S, 332, 333, 350/334

[56] References Cited

U.S. PATENT DOCUMENTS 3,891,307 6/1975 Tsukamoto et al. ............ 350/333
3,895,372 7/1975 Kaji et al. ............ 350/332 X
3,896,430 7/1975 Hatsukano ............ 350/332 X
3,902,169 8/1975 Washizuka ............ 350/332 X
4,367,924 1/1983 Clark et al. ............ 350/334
4,508,429 4/1985 Nagae et al. ............ 350/350 S

*Primary Examiner*—Donald A. Griffin
*Attorney, Agent, or Firm*—Blum Kaplan

[57] ABSTRACT

A method and circuits for multiplex driving of a multi-element liquid crystal display device having a ferroelectric liquid crystal therein. The method includes the step of applying at least one selecting electric field pulse having an amplitude which exceeds a threshold value of optical response of the ferroelectric liquid crystal to each element during a selecting term. It further includes the step of applying at least one non-selecting electric field pulse having an amplitude which is no greater than threshold value to each element at a time other than the selecting term. The optical response of the ferroelectric liquid crystal is determined in accordance with waveforms of the selecting and non-selecting pulses. According to the invention the duration of the non-selecting pulses is much smaller than the time between selecting terms. The width of the non-selecting pulses is minimized.

23 Claims, 42 Drawing Figures

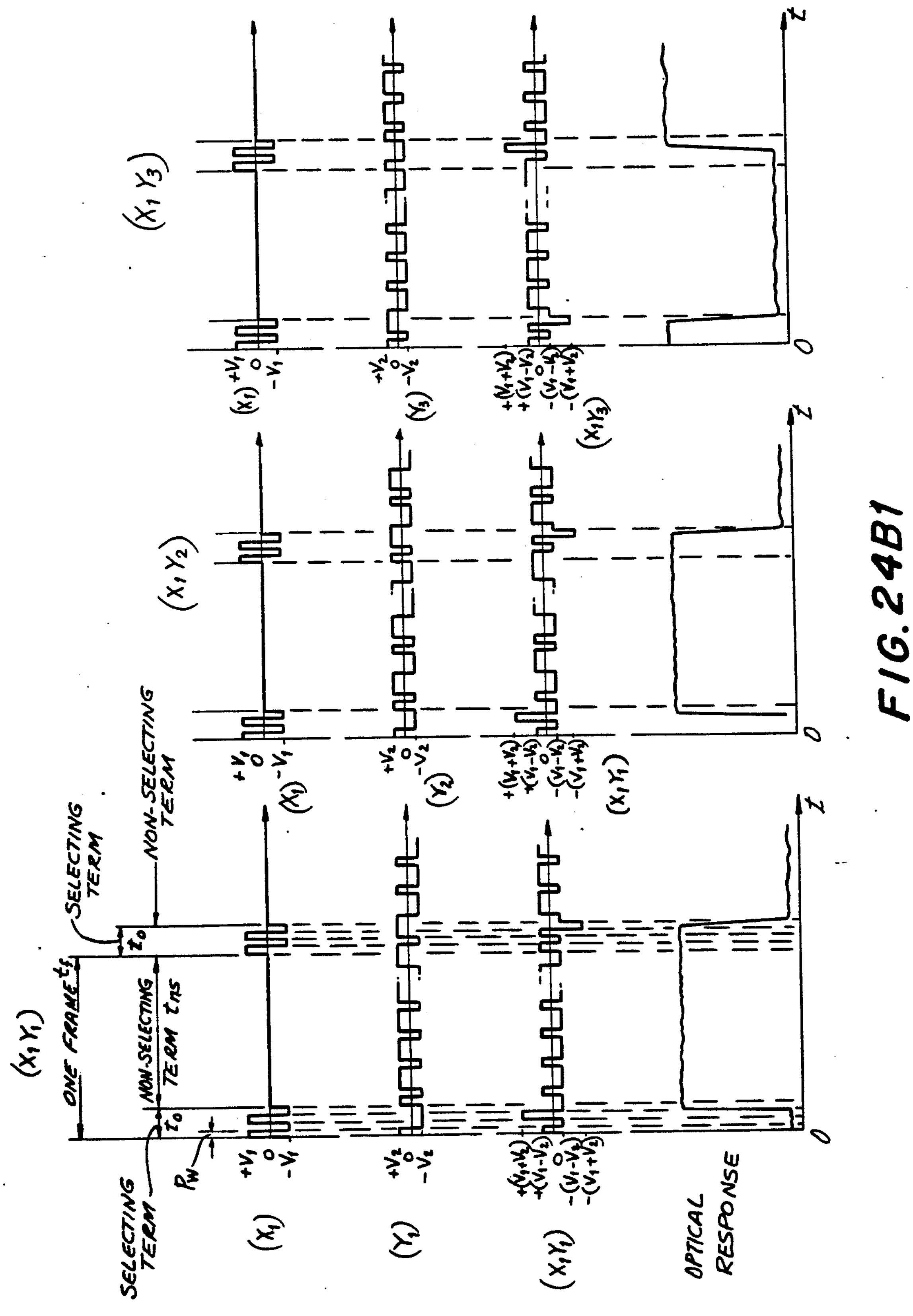
FIG. 24B1

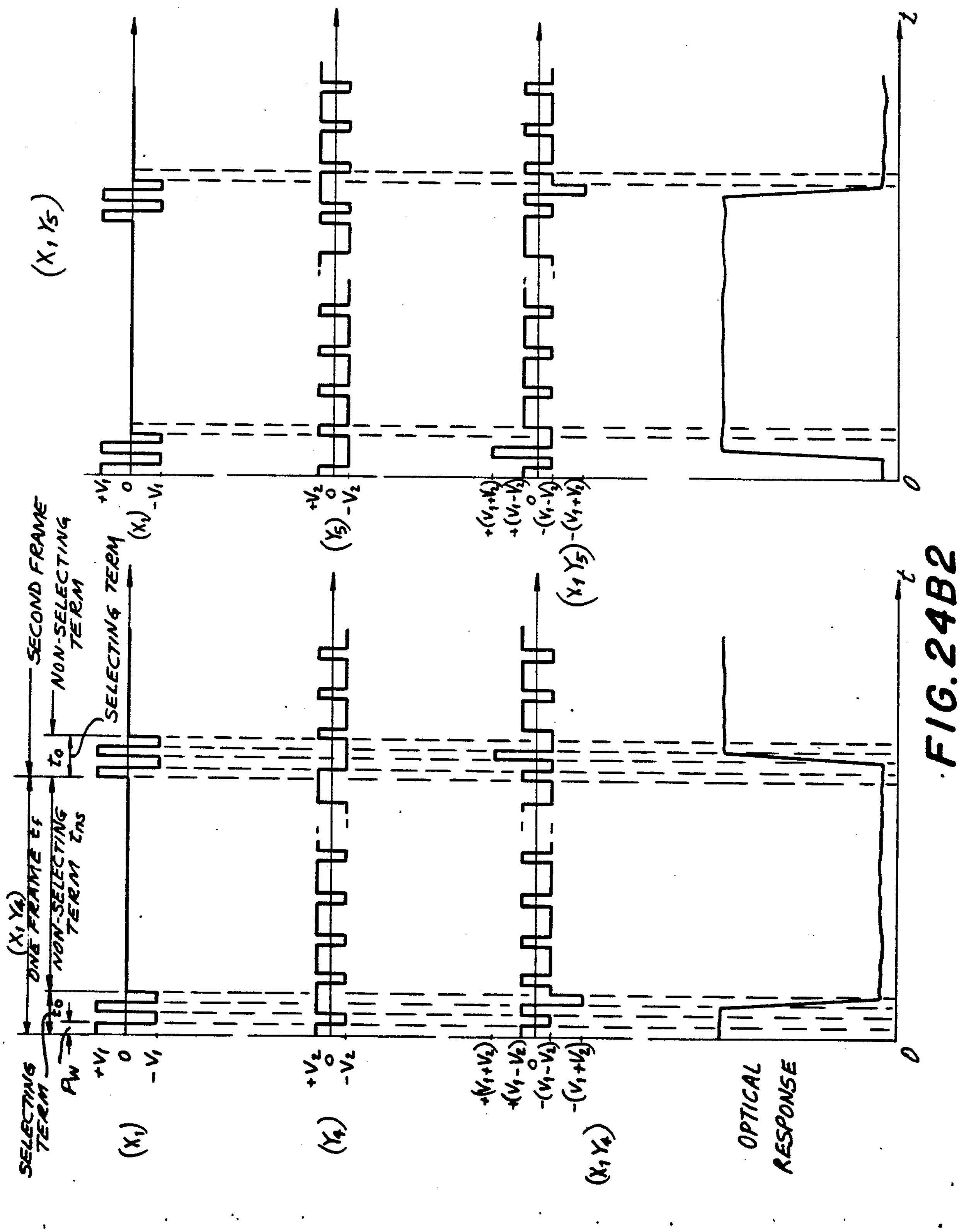
FIG. 24B2

METHOD AND CIRCUITS FOR DRIVING A LIQUID CRYSTAL DISPLAY DEVICE

BACKGROUND OF THE INVENTION

The present invention is generally directed to a method and circuits for driving a liquid crystal display device and in particular to a multiplex driving method and circuits for a multielement liquid crystal display device using a ferroelectric liquid crystal.

It is well known that if the amplitude of an electric field pulse applied to a ferroelectric liquid crystal ("FLC") molecule is large enough, the molecule can respond to a pulse having a pulse width of several microseconds and that the FLC will exhibit a memory effect, maintaining the response for a long period of time under suitable cell conditions. Thus, it was expected that a large size, high density display, with a large number of picture elements or an electronic shutter or similar device could utilize FLC. However, the relationship between the applied electric field pulse and the optical response of an FLC was not clear. This produced great uncertainty as to what waveform should be applied to an FLC in order to achieve multiplex driving.

Japanese Laid Open Publication No. 58-179890 describes a static drive method for a ferroelectric liquid crystal device. This method is not suitable for multiplex driving as it is not possible to make the DC component of the voltage applied to the (FLC) equal to zero since the FLC responds to the polarity of the applied electric field.

Additional reasons for why the static driving method is not suitable for a large picture element display is the complexity of: 1. the electrodes on a liquid crystal cell; 2. the connection of the electrodes and the ouput portions of a driver circuit; and 3. the complexity of the driver circuit itself. Thus, in order to produce large size displays, with a high density of elements, using an FLC and so as to have fast response time and memory effects, it is desirable to use a multiplex driving method suitable for an FLC.

The optical response of an FLC is not determined soley by the amplitude of the electric field pulse applied thereto. It is the area of the pulse applied to the FLC which determines the response. Thus, the light transmission state changes even for small amplitudes of the applied electric field if the pulse width is very long. This creates the difficulty of a change in the light transmission state when an electric field pulse having a polarity opposite to that of the electric field pulse which determines the light transmission state in a selecting term (and having a small amplitude and a long pulse width) is applied in a non-selecting term. As a result it is not possible to employ a multiplex driving method in the same manner as in a conventional twisted nematic liquid crystal.

Accordingly, there is a need for a method for multiplex driving of a liquid crystal device using FLC in which the application of a pulse during a non-selecting term or period does not affect the optical response of the FLC. Further, there is a need for circuitry for producing drive waveforms suitable for multiplex driving of a multielement liquid crystal display using an FLC.

SUMMARY OF THE INVENTION

The invention is generally directed to a method and circuits for multiplex driving of a multielement liquid crystal display device having a ferroelectric liquid crystal therein.

The method according to the invention includes the step of applying at least one selecting electric field pulse having an amplitude which exceeds a threshold value of optical response of the FLC to each element during a selecting term. It further includes the step of applying at least one non-selecting electric field pulse having an amplitude which is no greater than threshold value to each element during a non-selecting term. The optical response of the FLC is determined in accordance with wave forms of the selecting and non-selecting pulses.

According to the invention the duration of the non-selecting pulses is much smaller than the time between selecting terms. The width of the non-selecting pulses is minimized. Generally the selecting pulse and non-selecting pulse are of opposite polarity.

Accordingly, it is an object of the present invention to provide a drive method which is suitible for multiplex driving of a multielement liquid crystal display device using a FLC material.

It is another object of the invention to provide a multiplexing drive circuit suitable for multiplex driving of a multielement liquid crystal display device using a FLC material.

A further object of the invention is to provide a method and circuits for driving a multielement liquid crystal display device having selecting electrodes and common electrodes and using a FLC material.

Still other objects and advantages of the invention will in part be obvious and will in part be apparent from the specification.

The invention accordingly comprises the several steps and the relation of one or more of such steps with respect to each of the others, and the apparatus embodying features of construction, combinations of elements and arrangements of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings in which:

FIG. 24 illustrates the display pattern of the elements of a liquid crystal display device to be driven by a method in accordance with a first example of a fifth embodiment of the invention;

FIG. 24B1 and FIG. 24B2 illustrate the waveforms in accordance with the first example of the fifth embodiment of the invention;

DETAILED DESCRIPTION OF THE PREFERRED EMBODIMENTS

The present invention is generally directed to a method and circuits for multiplex driving of a multielement liquid crystal display device having a ferroelectric liquid crystal.

Figure 1A:
FIGS. 1A through 1C are schematic illustrations of the response of FLC molecules to an applied electric field.

FIG. 1 illustrates the response of FLC molecules to an applied electric field. The liquid crystal may have SmC* and SmH* phases. In a thick cell, the FLC has the helical structure shown in FIG. 1A when no electric field is applied. The molecules 1 tilt at an angle $\theta$ with respect to the helical axis 2. For example, the tilt angle of decyloxybenzylidene p'-amino 2 methly butyl cinnamate ("DOBAMBC"), having an alkyl chain length of 10, is 20° to 25°. See Table 1.

TABLE 1

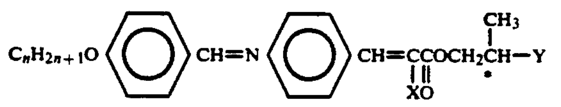

| | X | Y | n |
|---|---|---|---|
| 1 | H | $C_2H_5$ | 5~10, 12, 14 |
| 2 | H | Cl | 5~8, 10 |
| 3 | $CH_3$ | $C_2H_5$ | 6~12, 14 |
| 4 | C≡N | $C_2H_5$ | 7~10, 14 |
| 5 | Cl | $C_2H_5$ | 6, 8, 10, 14 |

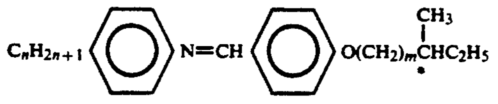

HO

| | m | n |
|---|---|---|
| 6 | 1 | 7~10 |
| 7 | 5 | 4, 8, 12 |

Figure 1B:
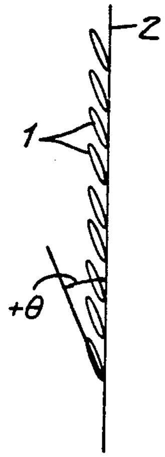

When an electric field of magnitude +E having an amplitude larger than a threshold value $E_c$ is applied to the winding FLC, the FLC molecules 1 are caused to be aligned in a plane perpendicular to the direction of the electric field +E at an angle $+\theta$ with respect to the helical axis 2 as shown in FIG. 1B. When the polarity of the electric field which aligns the molecules as shown in FIG. 1B is reversed, producing an electric field −E, the alignment of the liquid crystal molecules 1 is changed so that the molecules are disposed in a plane perpendicular to the direction of the electric field −E at an angle $-\theta$ with respect to the helical axis 2.

Figure 1C:
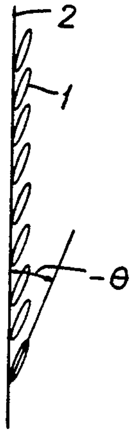

In a thin cell (for example, when DOBAMBC is used, the critical cell thickness is less than 4 to 5 μm) the helix is unwound, and when the electric field is not applied, the FLC molecules are aligned in either the state shown in FIG. 1B or the state shown in FIG. 1C. For example, if the electric field +E, having an amplitude larger than threshold value $E_c$ is applied to FLC aligned as shown in FIG. 1C, the molecules are religned as illustrated in FIG. 1B. Further, when the polarity of the electric field is reversed, all molecules are aligned as illustrated in FIG. 1C. Even though the electric field is removed, alignment as shown in FIG. 1C or as shown in FIG. 1B is maintained for a long period of time and, the FLC exhibits memory effect.

Figure 2:
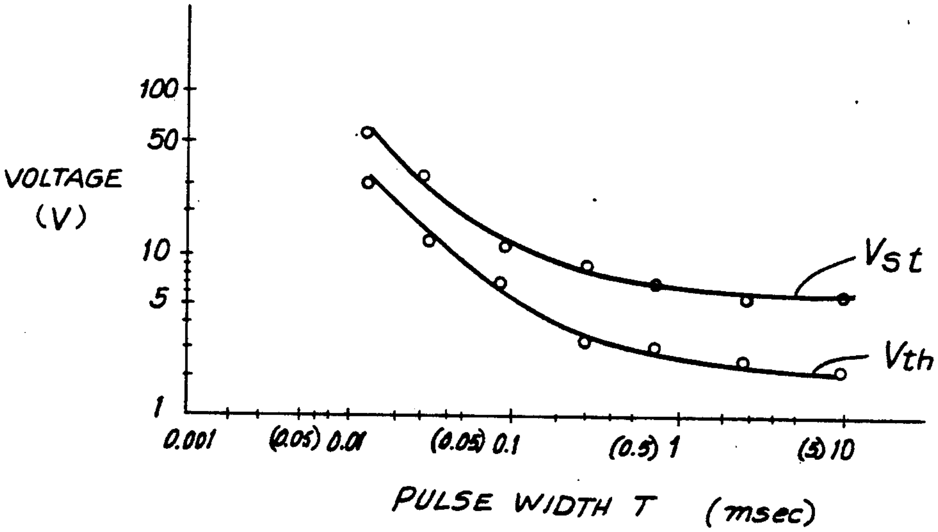
FIG. 2 graphically illustrates the relationship between threshold voltage and saturation voltage each as a function of pulse width for a typical FLC material.

FIG. 2 is a graphical representation of the relationship between threshold voltage and saturation voltage at various pulse widths in DOBAMBC liquid crystal, in a cell having a thickness of approximately 1 μm at a temperature of approximately 80° C. The characteristics shown in FIG. 2 change with changes in cell thickness, temperature, liquid crystal materials, surface treatment of the internal surfaces of the cell and other such factors. However, the fundermental characteristic shown in FIG. 2 does not change; that is the longer the width of the pulse, the lower the values of the threshold voltage and the saturation voltage.

Figure 3B:
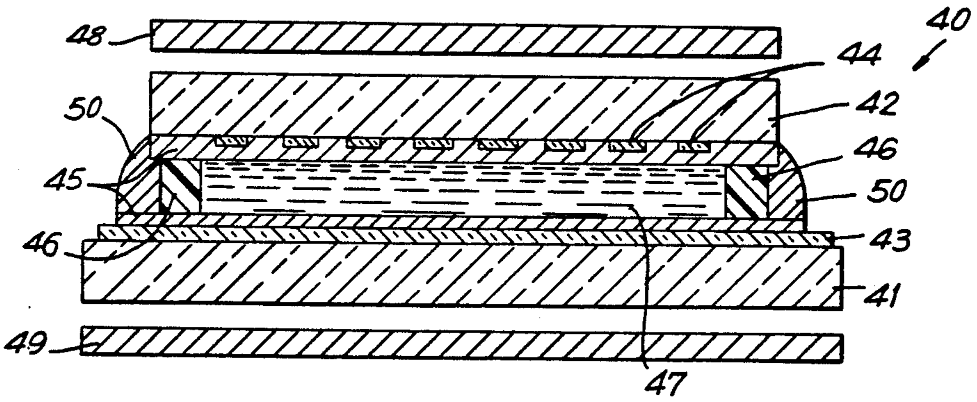
FIGS. 3A and 3B are schematic representations of a liquid crystal device which may be driven according to the method of the present invention, FIG. 3A being a plan view and FIG. 3B a cross sectional view taken generally along line 3B—3B' of FIG. 3A.
Figure 3A:
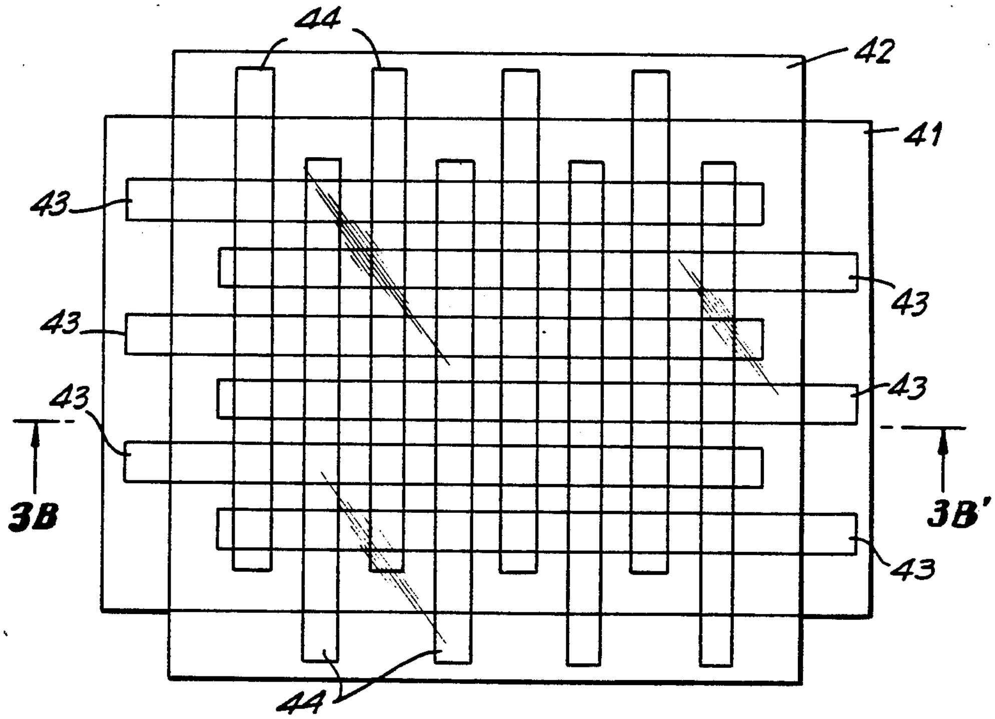

FIGS. 3A and 3B are plan and sectional views respectively of a multielement liquid crystal device shown generally at 40. Transparent electrodes 43 and 44, having a thickness from 500 to 1000 Å and comprising $In_2O_3$ or $SnO_2$ are formed on the inner facing surfaces of a pair of glass substrates 41 and 42. Each electrode has the shape of a stripe with a plurality of parallel electrodes arranged on each of substrates 41 and 42. Electrodes 43 and 44 are perpendicular to each other. Electrodes 43 are referred to as common electrodes X and electrodes 44 are referred to as segment electrodes Y. As may be occasionally required, an insulating layer 45 comprising $SiO_2$ is provided to cover the electrodes. A unidirectionally oriented polymer film of polyethylene terephthalate or nylon, or a deposited layer of Cr is sandwiched as a spacer 46 between substrates 41 and 42 in order to define the thickness of the liquid crystal layer. The liquid crystal device 40 is disposed between two polarizers 48 and 49 having polarizering directions which are perpendicular to one another. While an appropriate surface treatment of insulating layers 45 may be used to provide homogeneous orientation of the liquid crystal molecules, it is also possible to obtain such orientation by means of the shear forces suggested in U.S. Pat. No. 4,367,924 to Clark et al.

FIGS. 4A through 4E illustrate the optical response of an element in a liquid crystal display device utilizing FLC for various electric field pulses, wherein DOBAMBC is used and the thickness of the liquid crystal layer is 0.3 μm. States of the FLC element corresponding to ON and OFF are determined by the polarity of the applied electric field pulse.

Figure 4A:
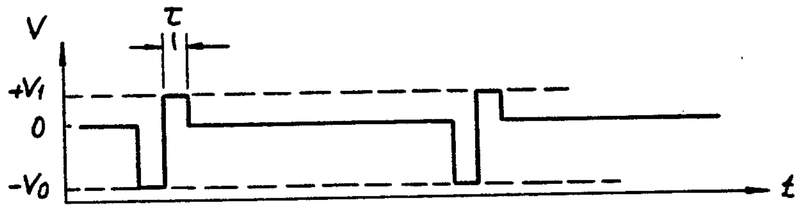
FIGS. 4A through 4E illustrate the optical response of FLC material with respect to electric field pulses of various amplitudes.
Figure 4B:
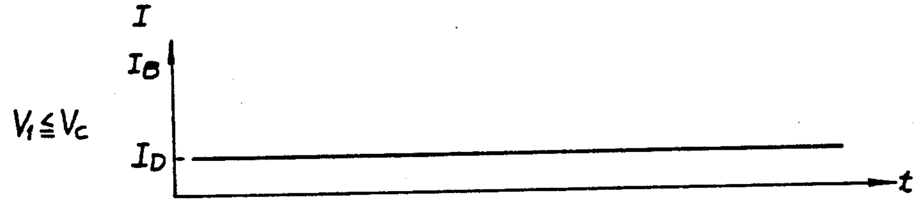
Figure 4C:
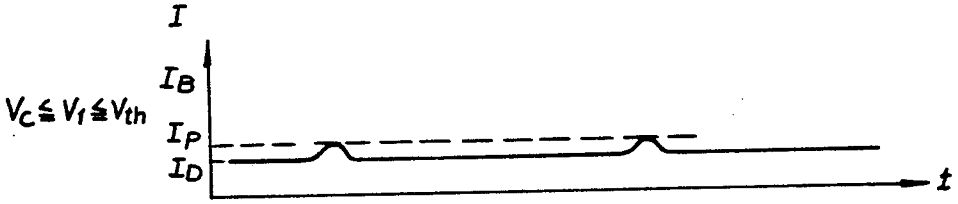
Figure 4D:
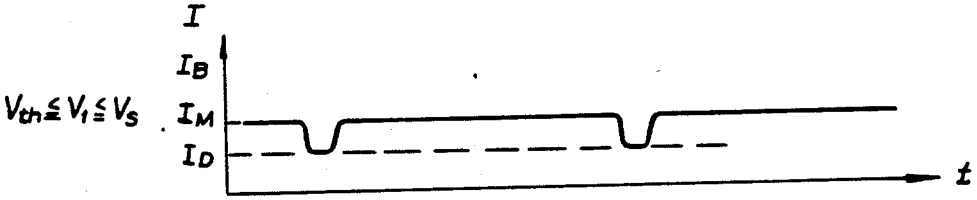
Figure 4E:
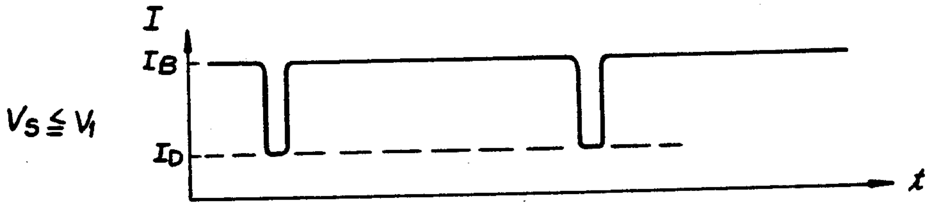

In FIG. 4A, a pulse of amplitude $-V_o$ is the erase pulse which results in a light transmittance $I_D$ as shown in FIG. 4B. A pulse of amplitude $+V_1$ applied after the erase pulse determines the light transmission state of the liquid crystal element. In a case where $V_1$ is smaller than a critical value $V_c$, light transmittance does not change at all as illustrated in FIG. 4B. However, when $V_1$ becomes larger than $V_c$, light transmittance increases to $I_p$ only when $V_1$ is applied. There is no memory effect and light transmittance returns to $I_D$ after the pulse having amplitude $V_1$ is removed, as illustrated in FIG. 4C. The change of light transmittance from $I_D$ to $I_P$ is negligible, since it is only several percent of the total change from light transmittance $I_D$ to light transmittance $I_B$ which occurs when a pulse having an amplitude at least as large as a saturation value $V_s$ is applied. When $V_1$ becomes higher than a threshold value $V_{th}$, memory effect appears and the light transmittance changes from $I_D$ to $I_M$, which is illustrated in FIG. 4D and is of a sufficient magitude to be preceived by an observer. Further, as illustrated in FIG. 4E, if $V_1$ becomes much greater, the change of light transmittance from $I_D$ to $I_M$ becomes large and when $V_1$ is of a value equal to saturation value $V_s$, $I_M$ becomes equal to $I_B$. Then, if $V_1$ becomes larger than $V_s$, light transmittance undergoes no further change.

As noted above, FIG. 2 shows that the threshold voltage and the saturation voltage vary with the pulse width. Thus, it is not only the amplitude of the electric field pulse, but also the pulse width T that determine the optical response. If the pulse width is shorter than some critical value, $V_{th}$and $V_s$ are approximately inversely proportional to T. However, if the pulse width becomes larger than this critical value, the change of $V_{th}$ and $V_s$ becomes small. The critical value for DOBAMBC is approximately 100 μsec, below which $V_{th}$ and $V_s$ are inversely proportional to pulse width.

Thus, there is a possibility that the liquid crystal molecules will respond to the electric field pulse applied in a non-selecting term and that light transmittance will therefore change, if the amplitude of the electric field pulse is larger than the threshold value at that particular pulse width. Therefore, it is necessary to design new driving waveforms (and circuits for producing these waveforms) in which the amplitude of the electric field pulse applied in a non-selecting term does not exceed threshold value at the particular width of that pulse, regardless of the display pattern of the liquid crystal device. Further, it has been found that FLC cannot be operated by ordinary driving waveforms if the pulse width is too short. Therefore, if it is possible to apply to a liquid crystal element, during a non-selecting term, a high frequency pulse with a pulse width less than that of a selecting signal, favorable multiplex driving can be obtained even though the above mentioned threshold characteristic exists.

In a first embodiment of a driving method according to the invention the following conditions are met:

1. An erase pulse of amplitude $-V_3$ is applied for the first $t_1$ seconds, and a selecting pulses of length $t_3$ having an amplitude alternating between $V_1$ and $V_2$ and a polarity opposite to that of the erase pulse is applied for $t_2$ seconds to a common electrode.

2. A pulse train alternting between amplitude $V_4$ and $-V_5$ is applied to a segment electrode when the amplitudes of the selecting pulses are $V_1$ and $V_2$ respectively.

3. The difference between the amplitudes $V_4$ and $-V_5$is the same as the difference between the amplitudes $V_1$ and $V_2$.

4. $V_4$ and $-V_5$ are of opposite polarity.

5. When the larger of amplitudes $V_1$ and $V_2$ (for example $V_1$) is applied to the common electrode, the pulse of the two pulse amplitudes $V_4$ and $-V_5$ which has the same sign as that of the larger of $V_1$ and $V_2$ (for example $V_4$) is applied to the segment electrode.

6. The value of the area of the erase pulse, $V_3 \cdot t_1$is large enough to switch the liquid crystal from on to off. With $V_1 \geqq V_2$, the minimum value $V_4$ s of $V_4$ must be greater than or equal to zero and the maximum value $V_4$ 1 of $V_4$, the value of area $(V_1-V_4\ 1)\cdot t_2$ is smaller than the threshold value. In other words, below the threshold value the memory effect of FLC is not obtained, and the value of an area $(V_1-V_4\ s)\cdot t_2$ is larger than the threshold value.

7. Pulse width $t_3$ of the selecting term is selected so that the value of the area $V_4 1\cdot t_3$ is smaller than the above threshold value.

Figure 5A:
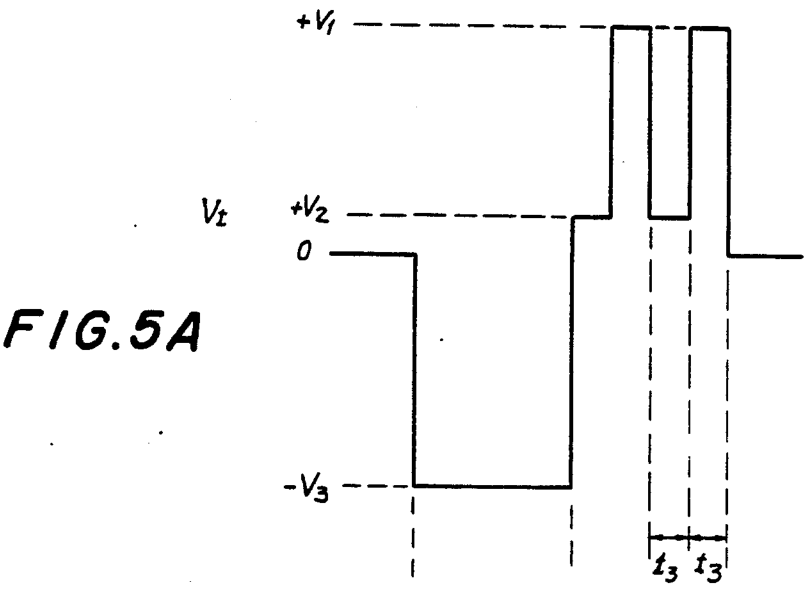
FIGS. 5A and 5B illustrates waveforms applied to a common electrode and a segement electrode respectively, during a selecting term, in accordance with a first embodiment of the invention.
Figure 5B:
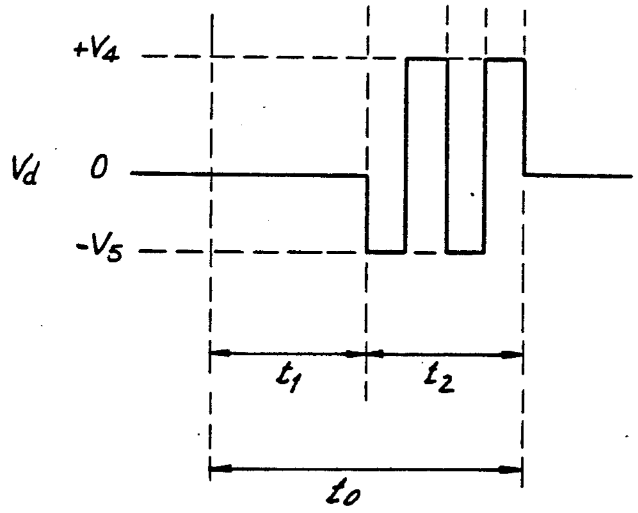

FIG. 5 illustrates one example of a driving waveform according to the first embodiment of the invention suitable for the operating characterists of the FLC element described with respect to FIGS. 3 and 4. FIG. 5A illustrates a scanning pulse $V_t$ which is applied to a common electrode. FIG. 5B illustrates a signal pulse $V_d$ which is applied to a segment electrode. A selecting term is represented by $t_o$. After an erase pulse of amplitude $-V_3$ is applied for the first $t_1$ second, selecting pulses of duration $t_3$ and alternating between amplitudes $V_1$ and $V_2$ of a polarity opposite to that of the erase pulse, are applied to the common electrode for the last $t_2$ second.

A signal pulse train having a positive amplitude $V_4$ and negative amplitude $-V_5$ is applied to a segment electrode during term $t_2$. The value of the area of the erase pulse, $V_3 \cdot t_1$ is large enough to completely switch the liquid crystal from on to off; that is, amplitude $V_3$ is larger than the saturation value at pulse width $t_1$. It is necessary that the value of the area $V_1 \cdot t_2$ is at least as large as the threshold value $(V \cdot t)_{th}$ shown in FIG. 6 and the value in the area $V_2 \cdot t_2$ is less than $(V \cdot t)_{th}$.

In the example illustrated in FIG. 5, $V_1$ is larger than $V_2$, $V_4$ is positive or zero and $-V_5$ is negative or zero. Further, $V_4 + V_5$ is equal to $V_1 - V_2$. The area $(V_1 - V_2)t_3$ is less than $(V \cdot t)_{th}$ as in $V_2 \cdot t_2$. In order to obtain the maximum contrast ratio, the following equations must be satisfied:

$$V_3 \cdot t_1 \geqq (V \cdot t)th$$

$$V_1 \cdot t_2 \geqq (V \cdot t)S$$

$$V_2 \cdot t_2 \leqq (V \cdot t)_{th}$$

In addition, since the fall time of the optical response is longer than the rise time, as may be seen in FIG. 4C, it is perferable that $t_1$ is longer than the fall time and that $(V_1 - V_2) \cdot t_3$ is smaller than $(V \cdot t)_{th}$. In other words, it is perferred that $t_3$ is as short as possible.

In order to completely switch the liquid crystal on after the liquid crystal is switched off by the erase pulse, it is necessary that $V_4 = 0$ and that $-V_5 = V_2 - V_1$. When switching does not occur the relationships $V_4 = V_1 - V_2$ and $-V_5 = 0$ should be satisfied.

In order to obtain an intermediate level of brightness, of the liquid crystal element, it is necessary that $V_4 \cdot V_5 \neq 0$ as shown in FIG. 5.

Figure 6:
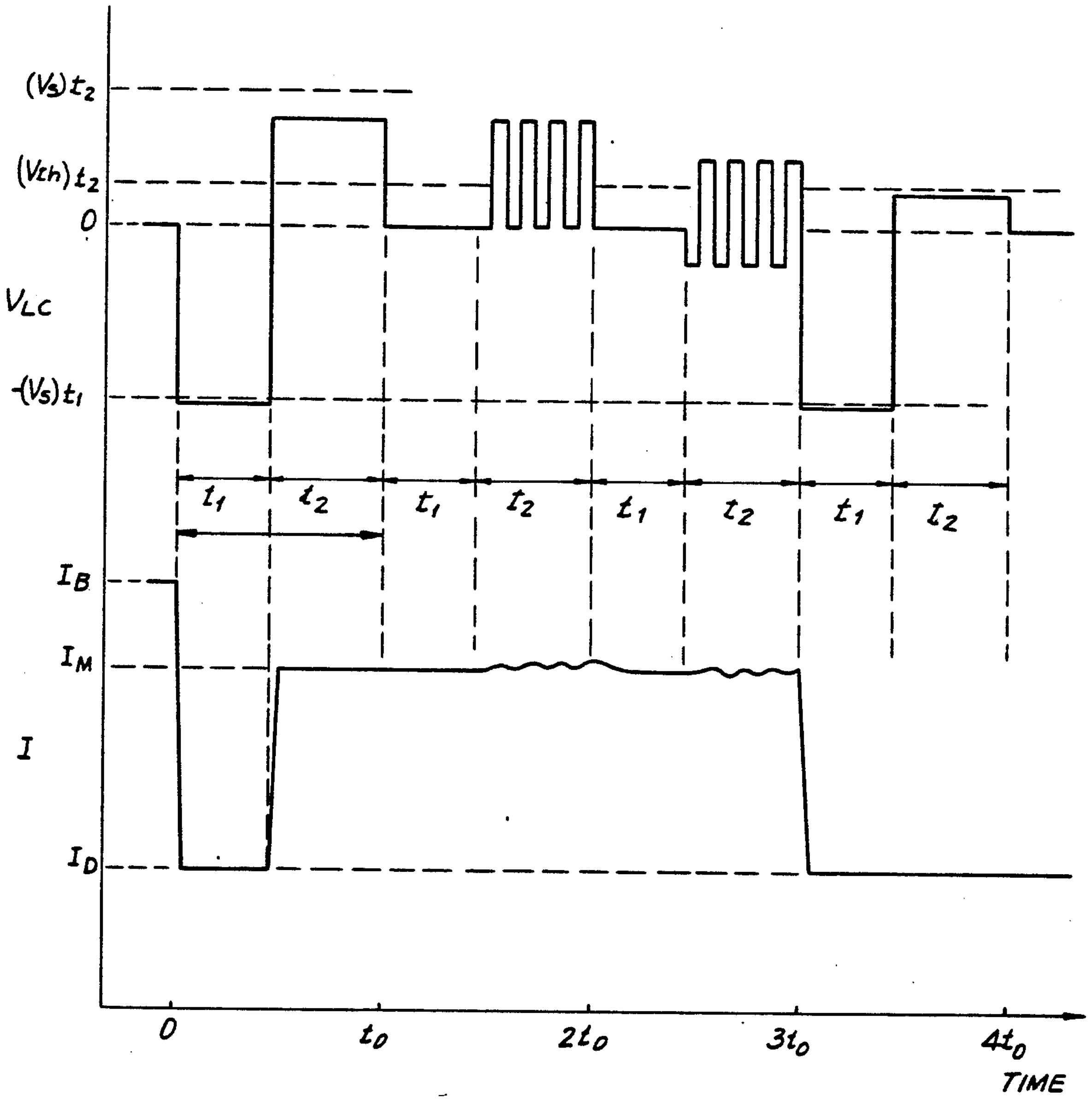
FIG. 6 illustrates the typical optical response of a liquid crystal display element using an FLC, in which the liquid crystal layer is supplied with a waveform in accordance with the first embodiment of the invention.

FIG. 6 illustrates an example of a waveform $V_{LC}$ according to the first embodiment of the invention which is applied to a liquid crystal. $(V_s)t_1$, $(V_s)t_2$ and $(V_{th})t_2$ indicate threshold value $V_{th}$ and satuation value $V_s$ at pulse widths $t_1$ and $t_2$. In this example electric field pulse trains are applied discontinuously for two intervals of duration $t_2$ spaced in time by intervals of duration $t_1$ in the non-selecting terms $t_o$ to $3t_o$. The area of one signal pulse is small enough with respect to the threshold value so that change of the light transmittance due to one signal pulse is only several percent. Further, the light transmittance is restored to its nominal value $t_1$ second after the end of the signal pulse train, and is therefore negligible.

In this embodiment DOBAMBC is used. The thickness of the liquid crystal layer is 0.4 μm, one frame occurs in 10 milliseconds (a duty cycle of 1/100), $t_1 = t_2 = 50$ μsec, $V_1 = 20$ volts, $V_2 = 5$ volts, $-V_3 = -20$ volts and $t_3 = 10$ μsec. Under these conditions, multiplexing drive can be accomplished without being adversely affected by voltage pulses applied in a non-selecting term.

In another embodiment, thickness of the liquid crystal layer is 0.3 μm, one frame has a duration of 10 miliseconds (a duty cycle of 1/167), $t_1 = t_2 = 30$ μsec, $V_1 = 35$ volts, $V_2 = 10$ volts, $-V_3 = -35$ volts and $t_3 = 5$ μsec. Under these conditions, multiplexing drive can be performed in the same manner as in the above example. In both examples, the contrast ratio is 1:25 and is not lowered even if the duty cycle is increased.

Figure 7:
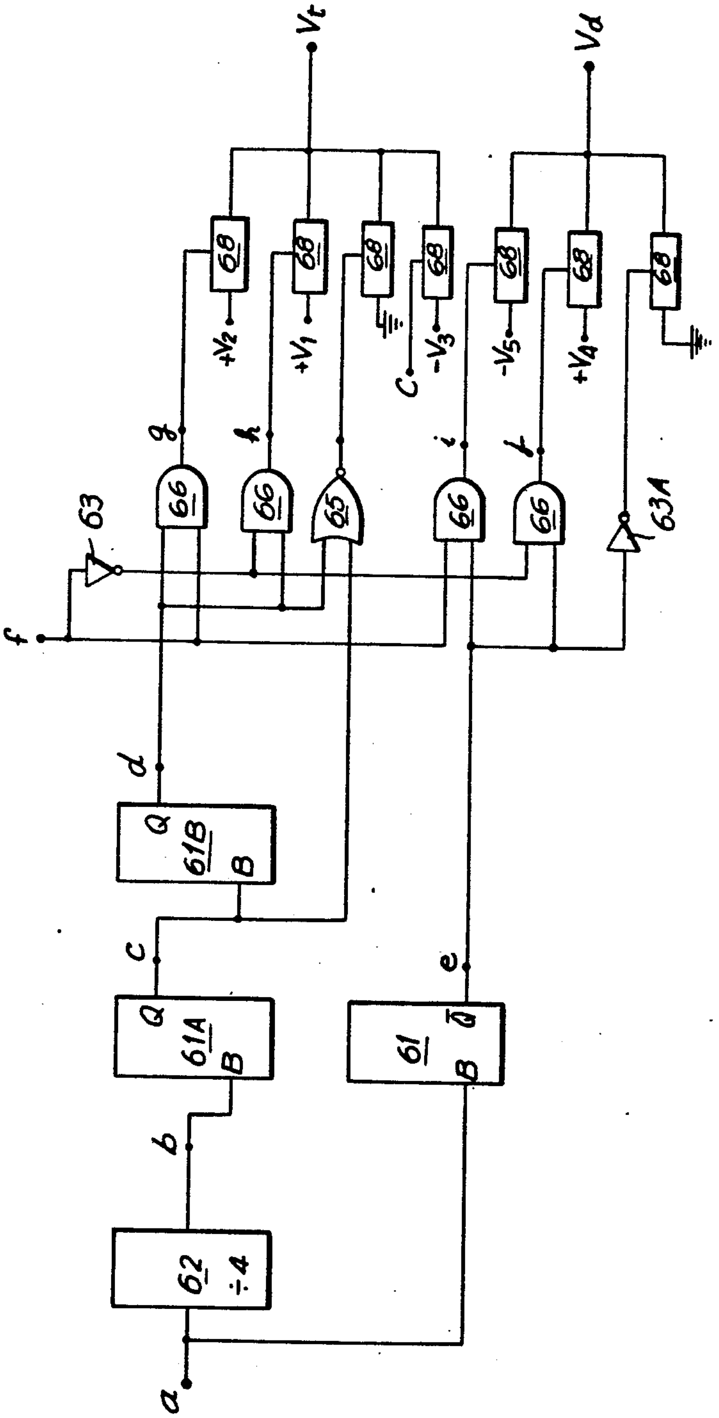
FIG. 7 is a schematic diagram of a circuit for generating a driving waveform in accordance with a first embodiment of the invention.
Figure 8:
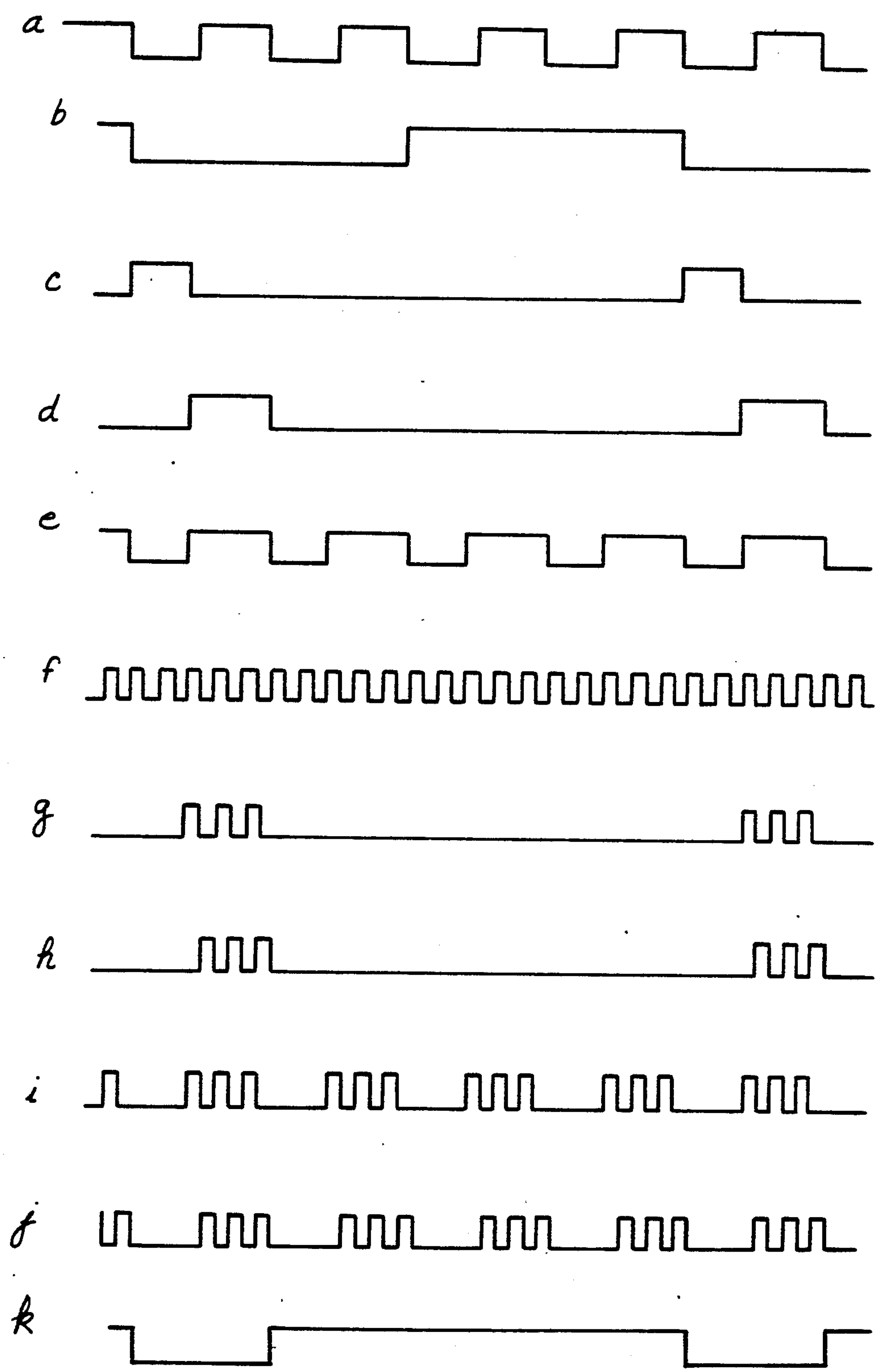
FIG. 8 is a timing diagram showing the waveforms of various signals in the circuit shown in FIG. 7.

FIG. 7 illustrates example of a circuit for generating the driving waveforms shown in FIG. 5. Waveforms of the signals at selected points of FIG. 7 are illustrated in FIG. 8. A square wave a is supplied to a oneshot multivibrator 61 and a counter 62 which is configured as a divide by 4, thus producing a signal b. Signal c is produced by a oneshot 61A and fed to a oneshot 61B. One shot 61 provides signal e. Signals c, d and e as well as a square wave signal f having a frequency five times that of signal a and synchronized with signal a, are fed to a series of AND gates 66, inverters 63 and NOR gate 65 as shown in FIG. 7. A series of transmission gates 68 selectively switches the voltages used to generate waveforms $V_t$ and $V_d$ in response to signals g, h, i, j the output of NOR gate 65 and the output of inverter 63A.

In a driving method according to a second embodiment of the invention the following conditions are satisfied:

1. An erase pulse having an amplitude $-V_0$ and a width $t_1$ is applied to a common electrode for the first $t_1$ second in a selecting term $t_0$.

2. A selecting pulse train of amplitude $2V_1$ having a period $2t_4$ and a width $t_4$ and which is of a polarity opposite to that of the erase pulse is applied for the last $t_2$ seconds of the selecting term.

3. A display pulse train alternating between amplitudes $+V_1$ and $-V_1$ and having a period of $2t_4$ and a width of $t_4$ is applied to a segement electrode for only the last $t_3$ seconds of the selecting term $t_2$.

4. The value of the area the erase pulse $V_o \cdot t_1$ is large enough to completely switch the liquid crystal from on to off.

5. The value of the area of selecting pulse $2V_1 \cdot t_4$ is less than threshold value.

6. The value of the area $V_1 \cdot t_2$ is larger than the threshold value.

7. Term $t_3$ in which a display pulse train is applied is less than $t_2$ seconds and when the amplitude of a selecting pulse is $+2V_1$, the amplitude of the display pulse train is $+V_1$.

Figure 9A:
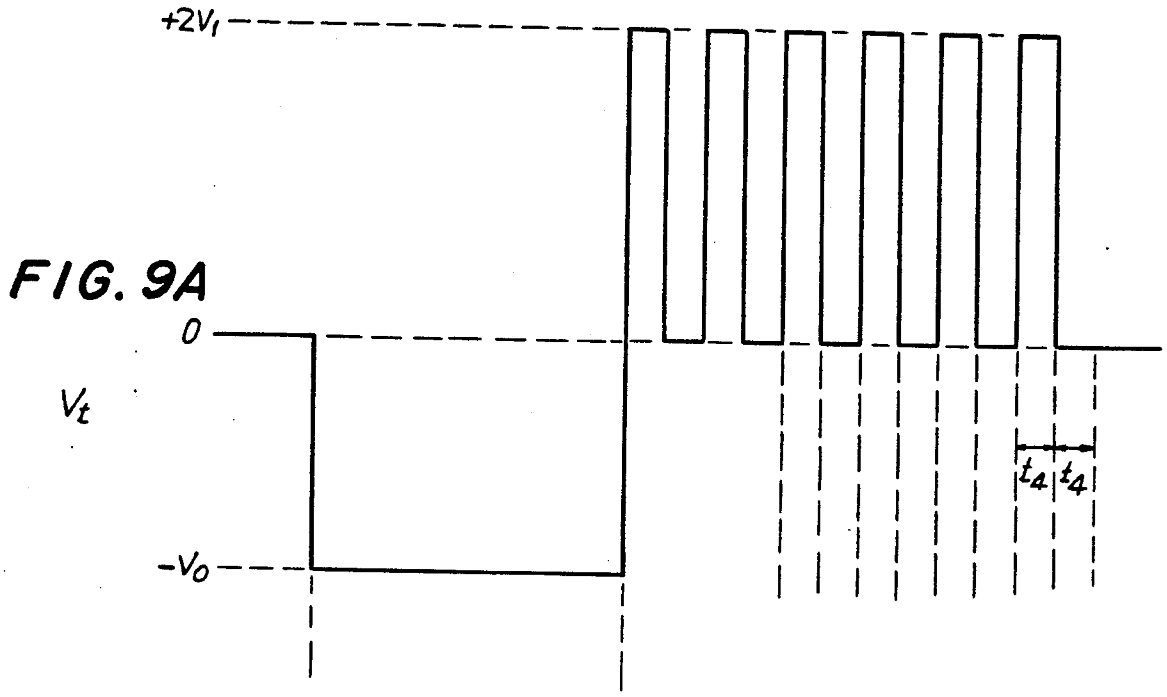
FIG. 9 illustrates waveforms applied to a common electrode and a segment electrode respectively of a liquid crystal display device during a selecting term in accordance with a second embodiment of the invention.
Figure 9B:
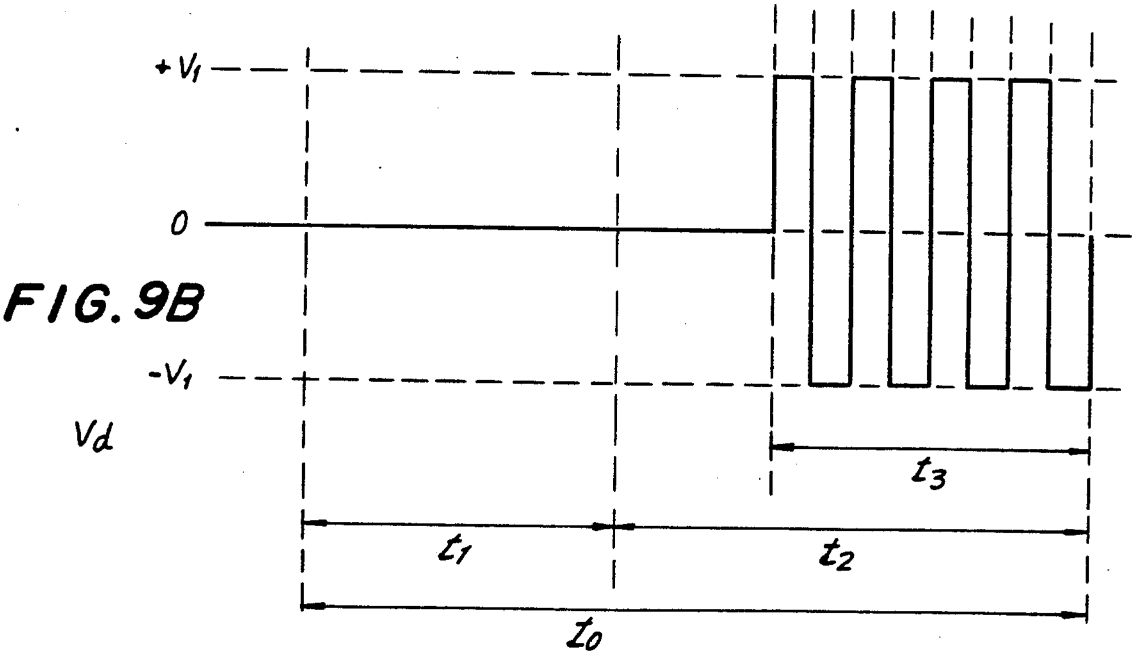

FIGS. 9A and 9B illustrate driving waveforms of the second embodiment. FIG. 9 illustrates a scanning pulse $V_t$ applied to a common electrode. FIG. 9B illustrates a signal pulse $V_d$ applied to a segement electrode. The selecting term is indicated by $t_o$. For the first $t_1$ seconds the erase pulse of amplitude $-V_o$ is applied to the common electrode. Then the selecting pulse train with a period of $2t_4$, a width $t_4$ and an amplitude of $+2V_1$ is applied for $t_2$ seconds. In order to obtain the maximum contrast ratio, it is necessary that $V_o$ and $V_1$ be higher than $V_s$ at pulse width $t_1$ and $t_2$ respectively, and that $2V_1$ is less than $V_{th}$ at pulse width $t_4$. Generally since the fall time of optical response of an FLC is longer than the rise time, it is required that $2V_1 \cdot t_4$ be small. This reduces the possibility of light transmittance change due to a cumulative response effect when a selected pulse train is continuously applied. However, contrast ratio is not remarkably lowered by the cumulative responsive effect. The signal pulse train to a segment electrode having a period of $2t_4$, a width of $t_4$ and amplitudes alternating between $+V_1$ and $-V_1$ is synchronized with the selecting pulse train for only $t_3$ seconds of the last period of $t_2$ seconds.

Figure 10:
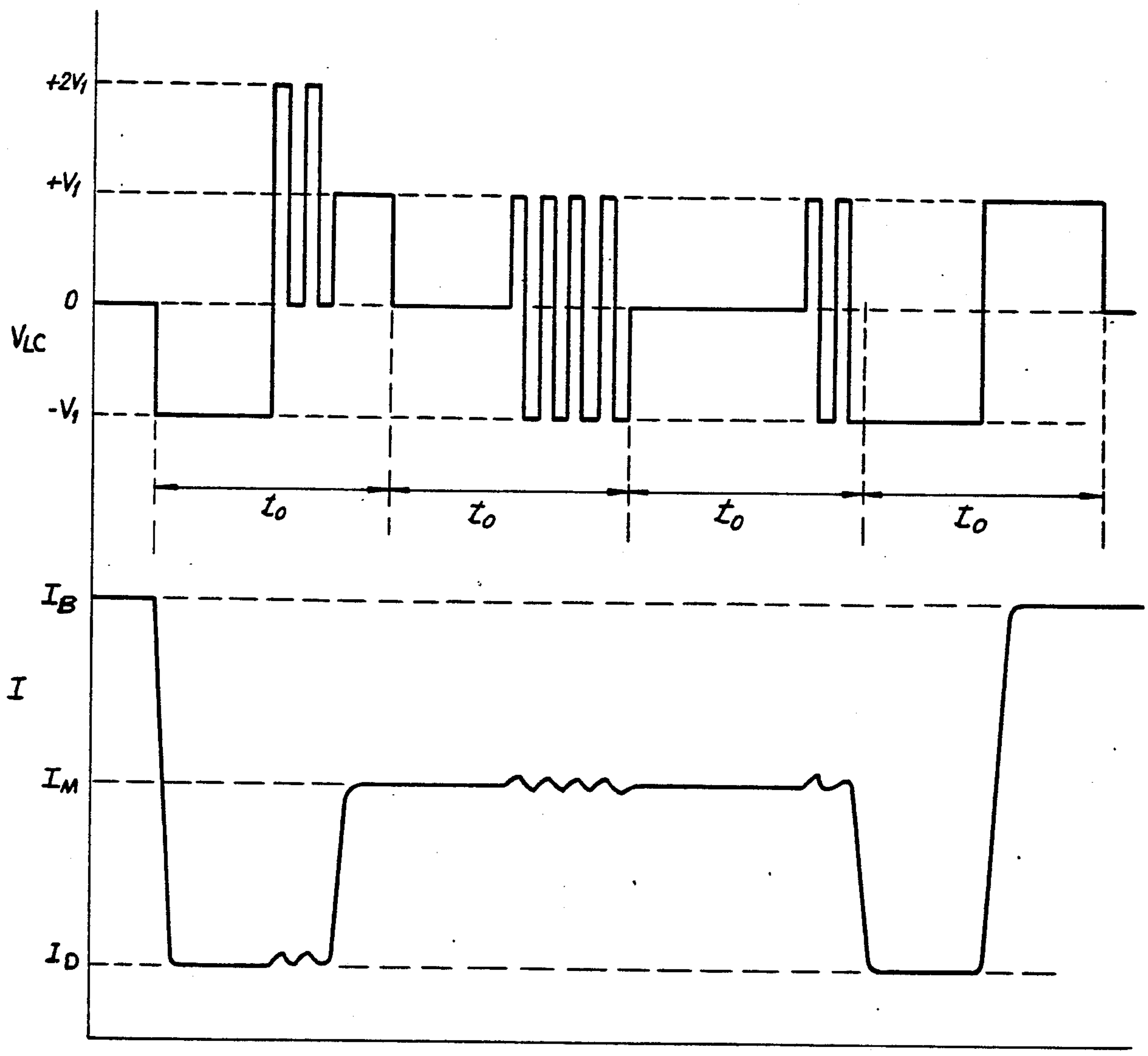
FIG. 10 illustrates the optical response of a liquid crystal device to a waveform applied to a liquid crystal layer therein in accordance with the embodiment of FIG. 9.

FIG. 10 illustrates the typical response of an element of the liquid crystal display device to the waveform $V_{LC}$ which is applied to a liquid crystal layer in accordance with the driving method illustrated in FIG. 9. In this example, $V_o = V_1, t_1 = t_2$ and one frame is $3t_o$. After light transmittance $I_D$ is selected by applying the erase pulse, light transmittance $I_M$ can be obtained by controlling the length of time $t_3$ for which the signal train is applied. During a non-selecting term, a pulse alternating between amplitudes $+V_1$ and $-V_1$ is applied to the liquid crystal layer. In this case, the level of the light transmittance fluctates around the level of $I_M$ in accordance with the changes in level of the signal pulse train, since the area of the voltage pulse $V_1 \cdot t_4$ is less than the threshold value. Thus, there is no substantial effect perceived by the observer.

In FIG. 9B a voltage pulse train is applied to the segment electrode in the last $t_3$ seconds of the selecting term. However, whenever the scanning pulse is applied to the common electrode, the signal pulse train can also be applied to the segment electrode. If, for example, $V_o t_1 = V_1 t_2$ and $t_2$ and $t_3$ are an even number of times the duration of $t_4$, the DC component of voltage applied to the liquid crystal is zero and deterioration of the liquid crystal is prevented.

In a first example of this second embodiment, a display element is constructed using DOBAMBC. The thickness of the liquid crystal layer is 0.4 μm. Setting $V_o = V_1 = 22$ volts, $t_1 = t_2 = 48$ μsec, $t_4 = 3$ μsec and the duty cycle is 1/512, a contrast ratio of 1:29 is obtained, since the threshold characteristics are $V_{th} = 8$ volts and $V_s = 22$ volts at a pulse width of 48 μsec.

In a second example of this embodiment, DOBAMBC is used and the thickness of the liquid crystal layer is 1.0 μm. The thickness is such that a sharp threshold characteristic is not obtained. At a pulse width of 48 μsec $V_{th} = 0.6$ volts and $V_s = 12$ volts. If a comparison is made with the first embodiment, wherein the thickness of the liquid crystal layer is small, it will be noted that the value $V_s$ in the second embodiment is smaller in than the first embodiment. This follows from the fact that as the thickness of the liquid crystal layer becomes smaller, the anchoring effect of the substrate becomes larger and a larger amount of energy is required to change the molecular orientation. Setting $V_o = V_1 = 12$ volts, $t_1 = t_2 = 48$ μsec, $t_4 = 1$ μsec and the duty cycle to 1/1024 multiplexing drive can be performed with a contrast ratio of 1:27.

Figure 11:
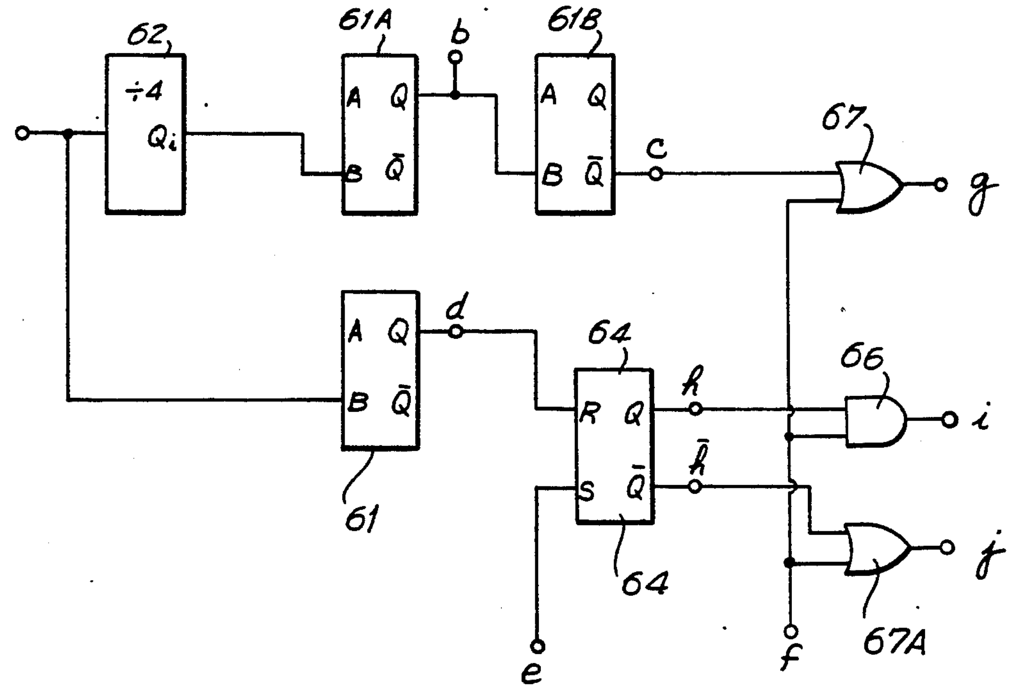
FIGS. 11 and 12 are circuit diagrams for generating driving waveforms in accordance with the second embodiment of the invention.
Figure 12:
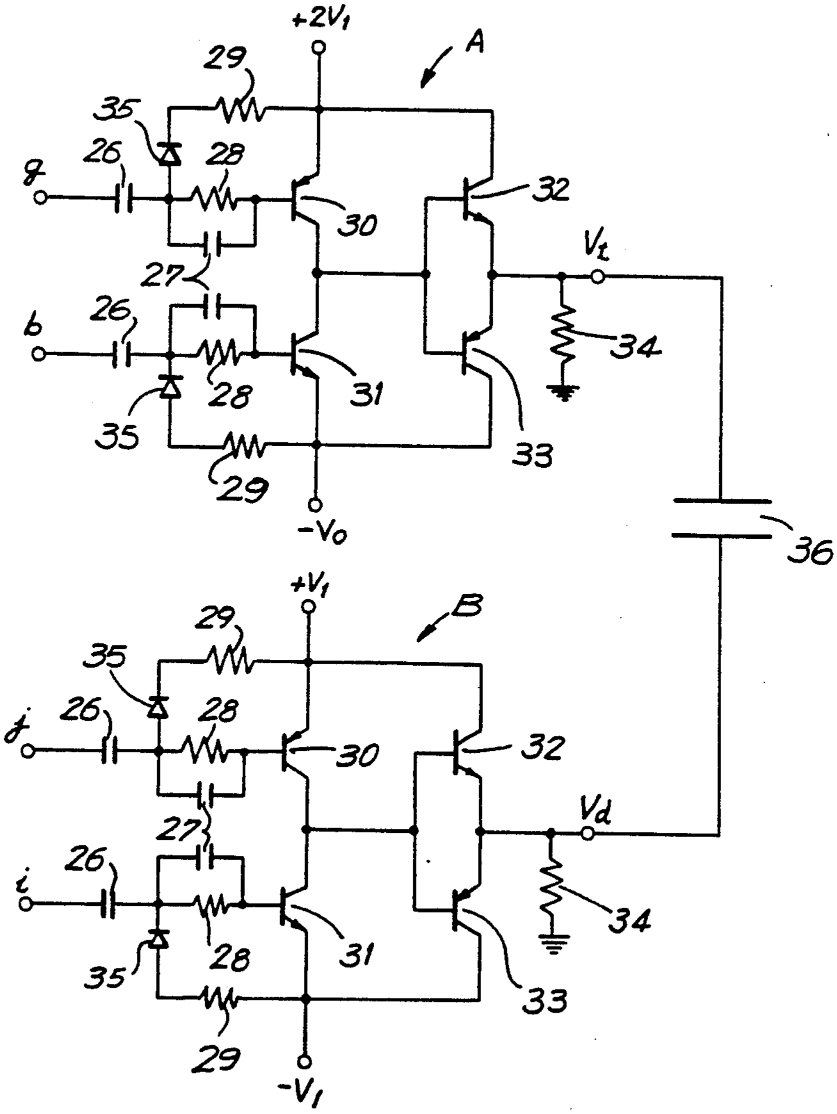

FIGS. 11 and 12 illustrate an example of a circuit for generating a driving waveform as shown in FIG. 9. FIG. 11 is a logic circuit wherein the components 61 are oneshot multivibrators, 62 is a counter configured to divide by 4 and 64 is an R-S flip-flop. FIG. 12 is a switching circuit for the liquid crystal element 36. The waveforms at selected points in the circuits illustrated in FIGS. 11 and 12 are shown in FIG. 13.

Figure 13:
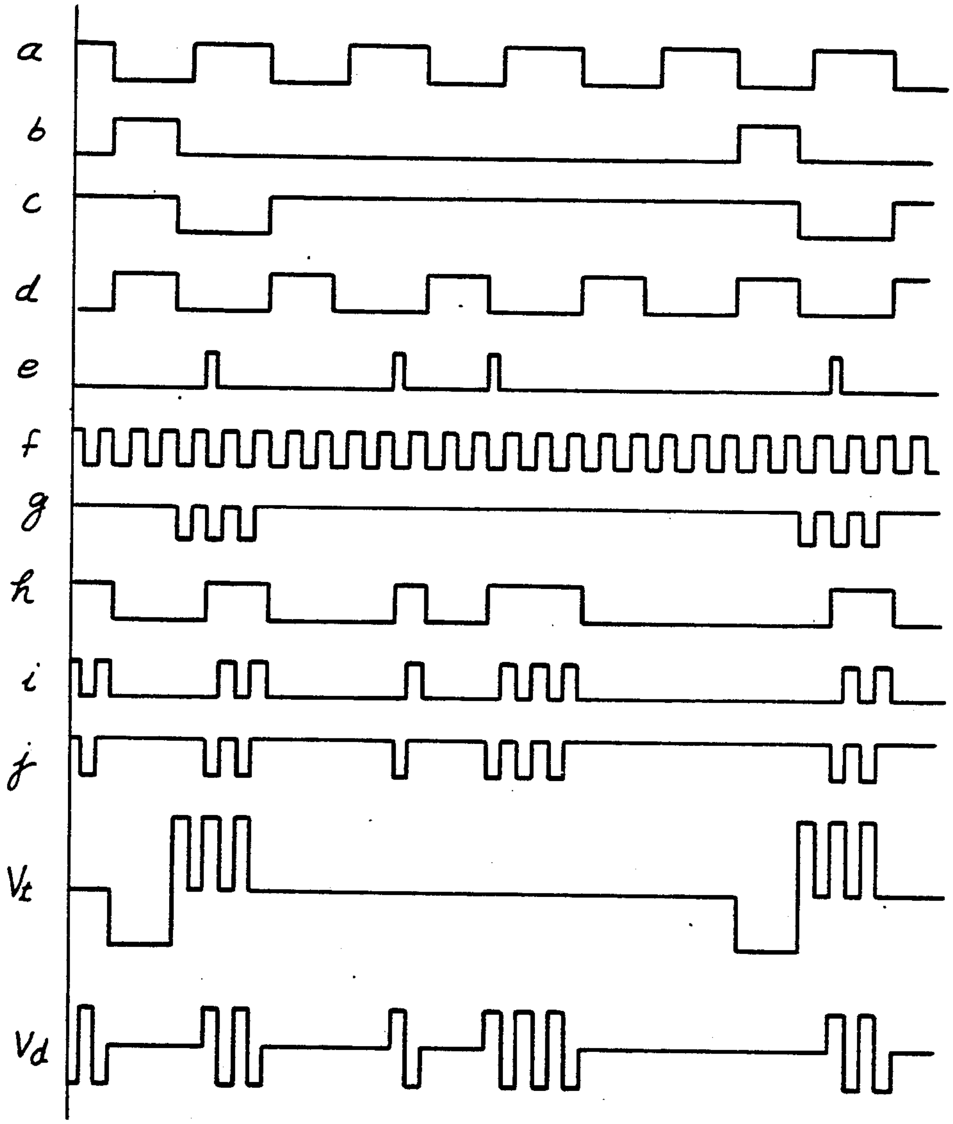
FIG. 13 is a timing diagram of the waveforms of signals in the circuits shown in FIGS. 11 and 12.

Square wave input a of FIG. 13 is applied to counter 62 and oneshot multivibrator 61. The divided output of counter 62 is applied to oneshot 61A. The output of oneshot 61A shown as waveform b in FIG. 13 is in turn applied to an input of oneshot 61B. The $\overline{Q}$ output of oneshot 61B is applied to a first input of OR gate 67. Square wave f having a frequency 5 times that of square wave a and synchronized thereto is applied to the other input of OR gate 67 to produce an output signal g.

The Q output of one shot 61 is applied to the R input of flip-flop 64. The waveform e illustrated in FIG. 13 (which represents data calling for turning the liquid crystal element on when a pulse is present) is applied to the S input of flip-flop of 64. The Q output of flip-flop 64 is applied to a first input gate 66 which produces an output signal i. The $\overline{Q}$ output of flip-flop 64 is applied to a first input of OR gate 67A. Signal f is applied to a second input of OR gate 67, which produces an output signal j.

Signals b, g, i and j are applied as inputs to the circuit of FIG. 12. The circuit of FIG. 12 has a first portion A for producing waveform $V_t$ and a second portion B for producing waveform $V_d$. In each of portions A and B the positive driving voltage is connected to the emitter of a PNP transistor 30 while the negative driving voltage is connected to the emitter of an NPN transistor 31. The collectors of transistors 30 and 31 are connected together and to the base of an NPN transistor 32 having its collector connected to the positive driving voltage and the base of a PNP transistor 33 having its collector connected to the negative driving voltage. The emitters of transistors 32 and 33 are connected together and to a first side of a resistor 34 having its other side connected to ground.

Input waveform b, g, i and j are conveyed through respective capacitors 26 to the junction between a diode 35 which is connected to the positive driving voltage through a resistor 29 and one end of an RC network consisting of resistor 28 and parallel capacitor 27. The other end of this network is connected to the base of its respective transistor 30 or 31. Circuit portions A and B respond to input signals b, g, i and j to produce the waveforms illustrated in FIG. 9. For example, when signal e goes high, the pulses of signal $V_d$ are generated until signal a goes low, at which time no further pulses of signal $V_d$ are generated until signal e again goes high.

In a driving method according to a third embodiment of the invention the following conditions are satisfied:

1. Pulses alternating between an amplitude $+V_1$ and $-V_1$ are applied to the common electrode in a selecting term.

2. High frequency alternating pulses to which FLC cannot respond are applied to the common electrode in a nonselecting term.

3. A voltage $+V_2$ or $-V_2$ is applied to the segment electrode in order to switch the liquid crystal on (into for example, a lighted state) and a voltage $-V_2$ or $+V_2$ is applied in order to switch the liquid crystal off (for example, a dark state) in a selecting term. 4. $V_1$ and $V_2$ are positive and satisfy the relationship $V_1 + V_2 > V_{th}$, $V_1 - V_2 \leqq V_{th}$, and $V_1 \geqq V_2$, where $V_{th}$ indicates threshold voltage.

FIG. 14 illustrates the driving waveforms and the optical response of a first example of the third embodiment. In a selecting term $t_o$, within a frame $t_f$, alternating pulses having amplitudes of $+V$ and $-V$ are applied to each common electrode. In a non-selecting term $t_{ns}$, high frequency pulses having a width of 5 μsec and amplitudes of $+V_2$ or $-V_2$ are alternately applied to the common electrodes. An electric field pulse of amplitude $-V_2$ having a duration equal to selecting term $t_o$ is applied to each segment electrode to turn it on. An electric field pulse of amplitude $+V_2$ having a duration equal to selecting term $t_o$ is applied to the segment electrode to turn the picture element off. Therefore, two electric field pulses having amplitudes $V_1 + V_2$ or $V_2 - V_1$ are applied to the liquid crystal layer in a selecting term. In non-selecting term $t_{ns}$ electric field pulses having a duration of 5 μsecs and amplitudes of $+2V$ or $-2V$ are applied to the liquid crystal layer. The amplitude $V_2 - V_1$ of the electric field applied in selecting term $t_o$ is less than the threshold voltage $V_{th}$. The light transmittance is therefore not influenced by the electric field pulse of amplitude $V_2-V_1$.

Figures 14A, 14B, 14C:
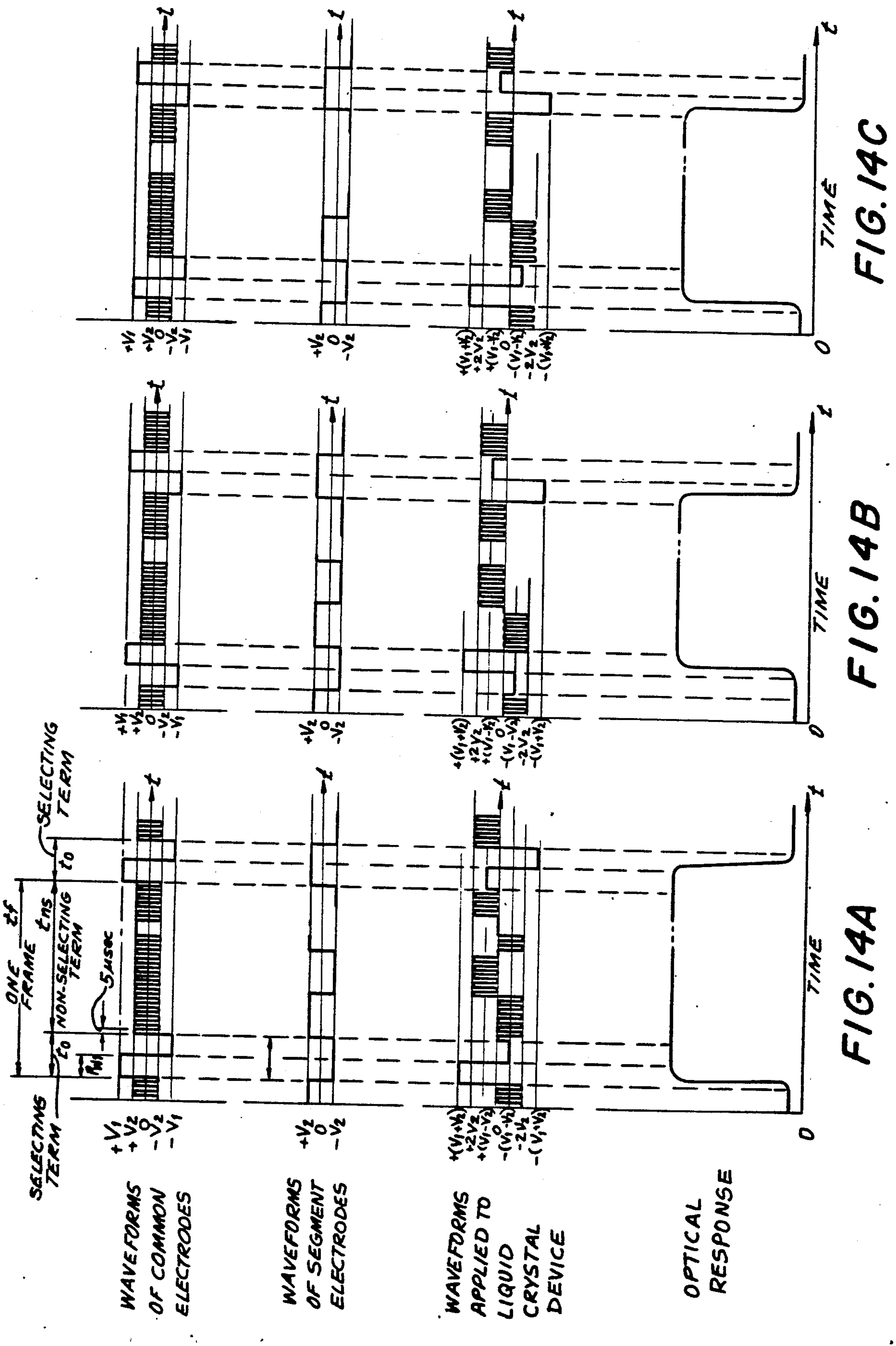
FIGS. 14A through 14C show typical optical response of a liquid crystal device to driving waveforms in accordance with a first example of a third embodiment of the invention.

FIG. 14A illustrates waveforms wherein a positive pulse is first applied and a negative pulse is then applied to the liquid crystal layer in selecting term $t_o$. FIG. 14B illustrates waveforms wherein a negative pulse is first applied and then a positive pulse is applied in a selecting term $t_o$. FIG. 14C illustrates waveforms wherein a positive pulse and a negative pulse are alternately the first pulse applied. In any method illustrated in FIG. 14, a field corresponding to amplitude $+(V_1+V_2)$ or $-(V_1+V_2)$ is applied to the FLC layer in a selecting term $t_o$. In other words, it is possible to select both an on state and an off state while high frequency pulses of amplitude $+2V_2$ or $-2V_2$ having a duration of 5 μsec are applied to the FLC layer in a non-selecting term $t_{ns}$. Therefore, the light transmittance selected in a selecting term does not change.

Waveforms as shown in FIG. 14A may be chosen so that $V_1=5$ volts, $Pw_1=500$ μsec, $V_2=2.5$ volts, $Pw_2=1$ millisecond, frame $t_f$ has a duration of 200 milliseconds, +7.5 volts or −7.5 volts is applied to the FLC layer in a selecting term and high frequency pulses having a width of 5 μsec and amplitudes of +5 volts of −5 volts are applied in non-selecting term $t_{ns}$. When a liquid crystal device of the type shown in FIG. 3 is driven by this driving method, light transmitting properties of high quality as shown in FIG. 14 are obtained. Further, utilizing the driving method shown in FIGS. 14B and 14C, high quality light transmitting properties similar to those obtained using the waveforms of FIG. 14A are obtained under the above mentioned driving conditions.

Figure 15:
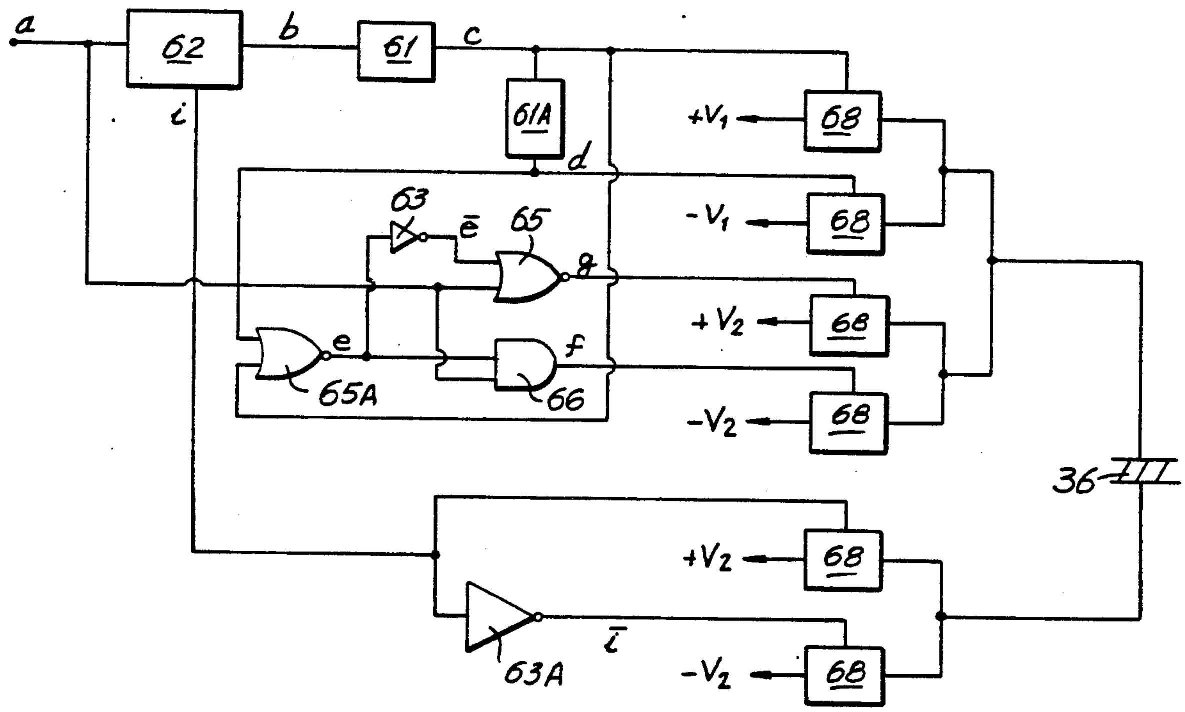
FIG. 15 is a schematic diagram of a circuit used for generating the driving waveforms shown in FIG. 14.
Figure 16:
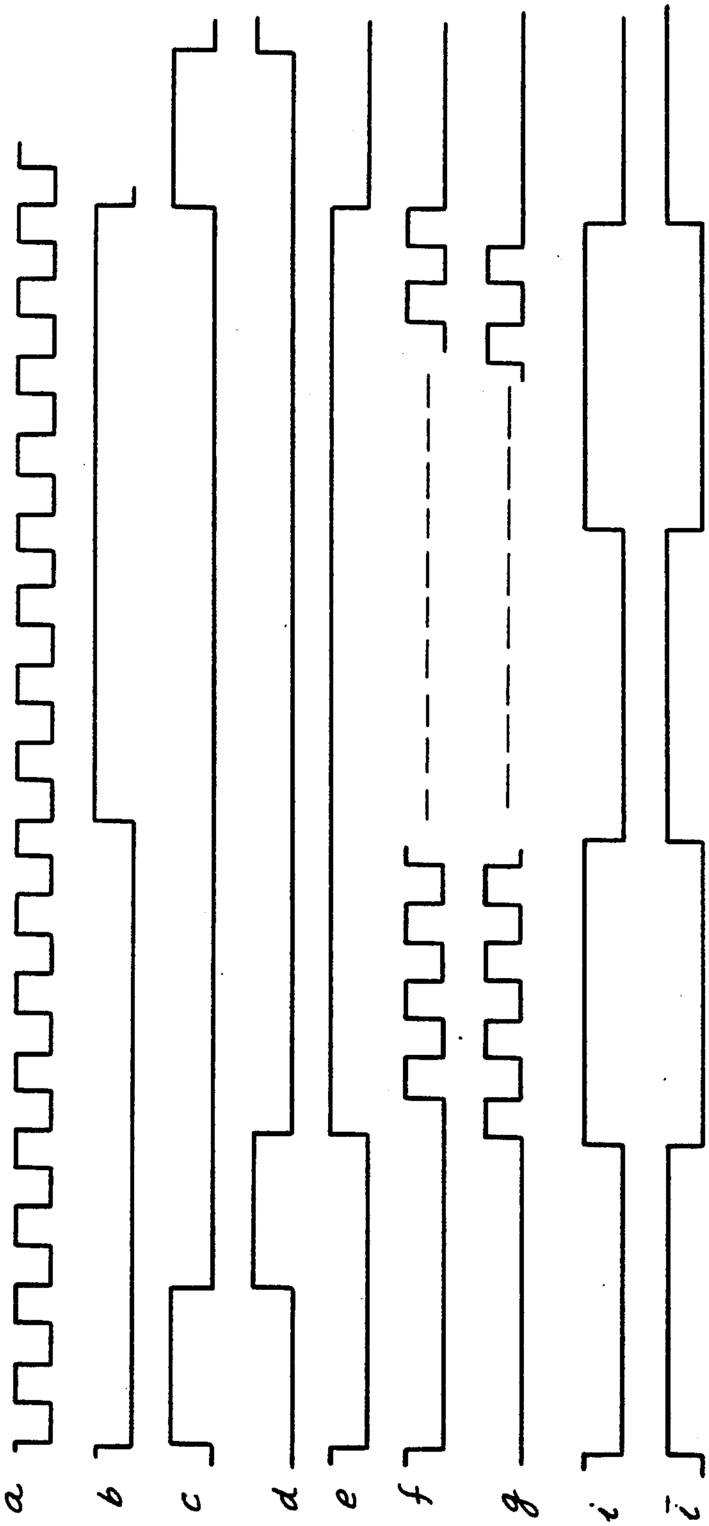
FIG. 16 is a timing diagram for waveforms of signals of the circuit shown in FIG. 15.

FIG. 15 is an example of a circuit for generating the driving waveform shown in FIG. 14. FIG. 16 illustrates signal waveforms at points in the circuit of FIG. 15. Square wave a is applied to counter 62 and one input of each of AND gate 66 and NOR gate 65. Counter 62 is configured to frequency divide signal a by 16 to produce an output signal b to one shot 61 which in turn triggers one shot 61A. Output waveform d of one shot 61A is supplied to a first input of NOR gate 65A. The second input of NOR gate 65A receives signal c. Output waveform e of NOR gate 65A is supplied to the second input of AND gate 66 and the input of inverter 63. Output waveform $\bar{e}$ of inverter 63 is supplied to the second input of NOR gate 65 to produce output signal g. Counter 62 also divides the frequency of signal a by 8 to produce signal i which is applied to the input of inverter 63A to produce output $\bar{i}$.

Signals d, g, f and i are supplied to the control inputs of transmission gates 68 to produce the waveforms for driving the liquid crystal device 36.

Figure 17:
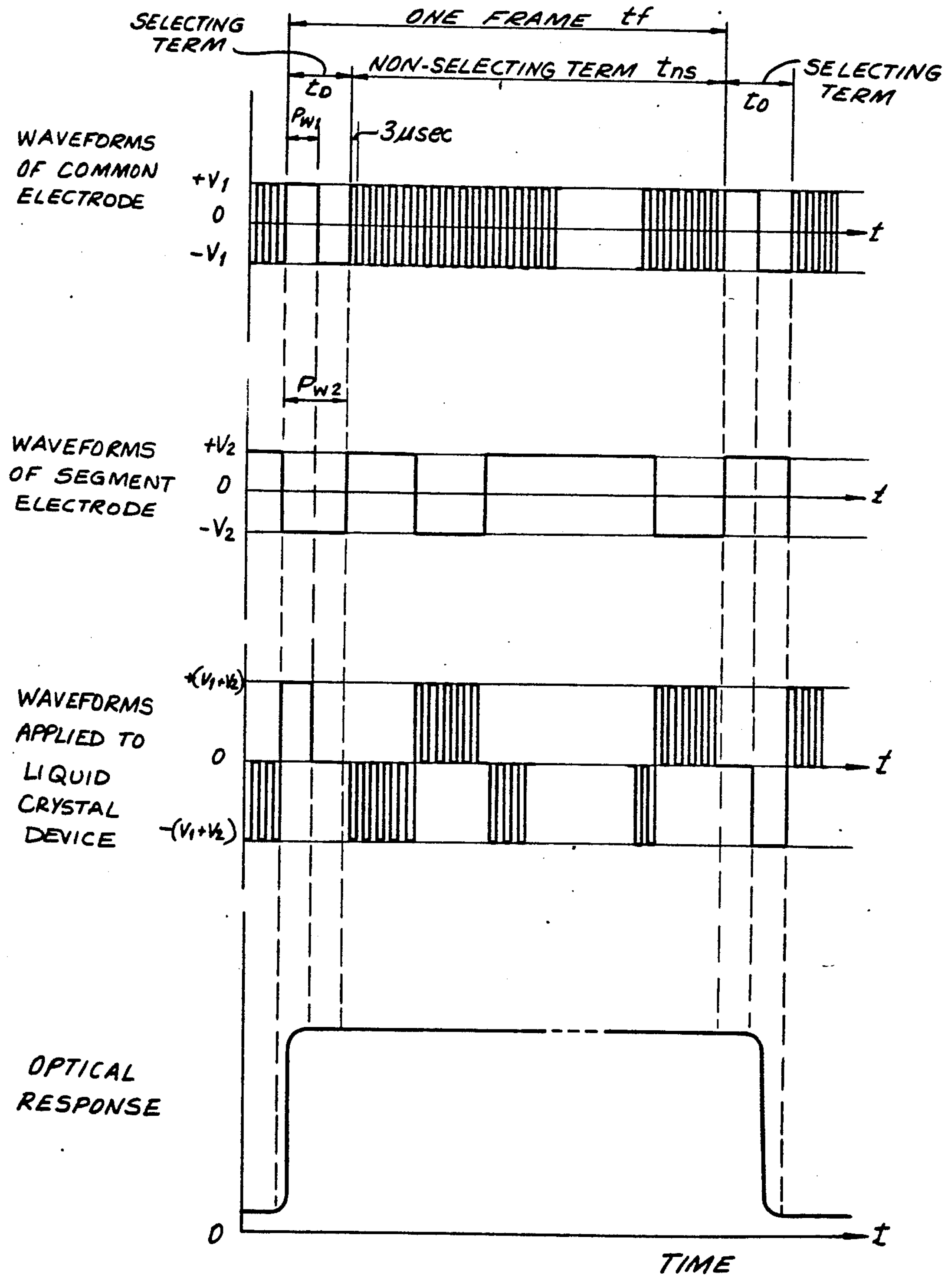
FIG. 17 illustrates the driving waveforms and optical response of a liquid crystal display element in accordance with a second example of the third embodiment of the invention.

FIG. 17 illustrates driving waveforms and optical response of a second form of the third embodiment of the invention. The waveforms of FIG. 17 are different from the waveforms of FIG. 14 in that the absolute values of $V_1$ and $V_2$ are equal. For example, the liquid crystal device may be driven by the waveforms shown in FIG. 17 wherein $V_1=9$ volts, $Pw_1=50$ μsc, $V_2=9$ volts, $Pw_2=100$ μsec, one frame has a duration of 100 milliseconds and the pulse width and pulse amplitude of the high frequency pulses applied to the common electrode in non-selecting term $t_{ns}$ are 3 μsec and 9 volts, respectively. As a result, an electric field pulse of amplitude +18 volts or −18 volts is applied to the liquid crystal layer in selecting term $t_o$ and high frequency pulses of amplitudes +18 volts and −18 volts with a pulse width of 3 μsec are applied to the FLC in non-selecting term $t_{ns}$. The optical response obtained with this driving method is illustrated in FIG. 17 where it may be seen that the light transmittance selected in selecting term $t_o$ is not charged at all in non-selecting term $t_{ns}$.

Figure 18:
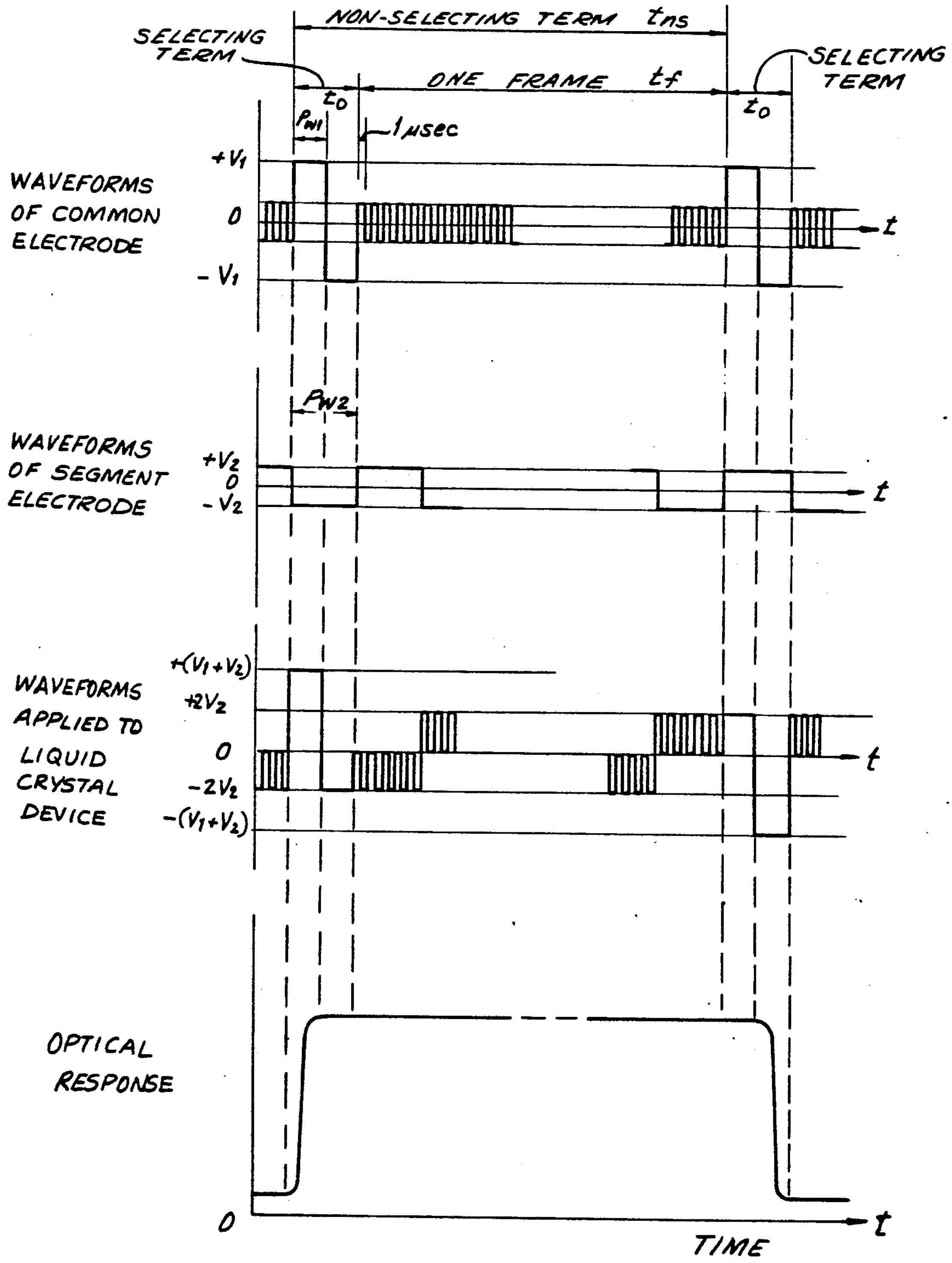
FIG. 18 illustrates the driving waveform and optical response in accordance with a third example of the third embodiment of the invention.

FIG. 18 illustrates driving waveforms and optical response for a third example of the third embodiment of the invention. The waveforms of FIG. 18 are different from the waveforms of FIG. 14 in that $V_1:V_2=3:1$. For instance the liquid crystal device is driven by the driving method shown in FIG. 18 wherein $V_1=24$ volts, $Pw_1=25$ μsec, $V_2=8$ volts, $Pw_2=50$ μsec, one frame has a duration of 15 milliseconds and the pulse width and amplitude of the high frequency pulse applied to the common electrode in non-selecting term $t_{ns}$ are 1 μsec and 8 volts respectively. As a result, an electric field pulse of amplitude +32 volts of −32 volts is applied to the liquid crystal layer in selecting term $t_o$ and high frequency pulses of amplitudes +16 volts of −16 ts having a pulse width of 1 μsec are applied in non-selecting term $t_{ns}$. The light transmittance obtained is illustrated in FIG. 18 wherein it is apparent that the light transmittance selected in selecting term $t_o$ is not changed at all in non-selecting term $t_{ns}$.

In a driving method according to a fourth embodiment of the invention the following conditions are satisfied:

1. Positive and negative electric field pulses of amplitude $V_1$ are applied alternately at least three times in a selecting term to each common electrode, while no electric field is applied thereto in a non-selecting term.
2. Electric field pulses of amplitude $V_2$ corresponding to the positive and negative electric field pulses applied to the common electrode and having a polarity opposite to that of the pulses applied to the common electrode, are applied to each segment electrode.
3. A picture element is switched on or off by inverting the polarity of the last electric field pulse applied in a selecting term.
4. $V_1$ and $V_2$ are both positive and the following relationships are maintained:

$$V_1+V_2>V_{th}$$

$$V_1-V_2\leq V_{th}$$

$$V_1\geq V_2$$

Figure 19A:
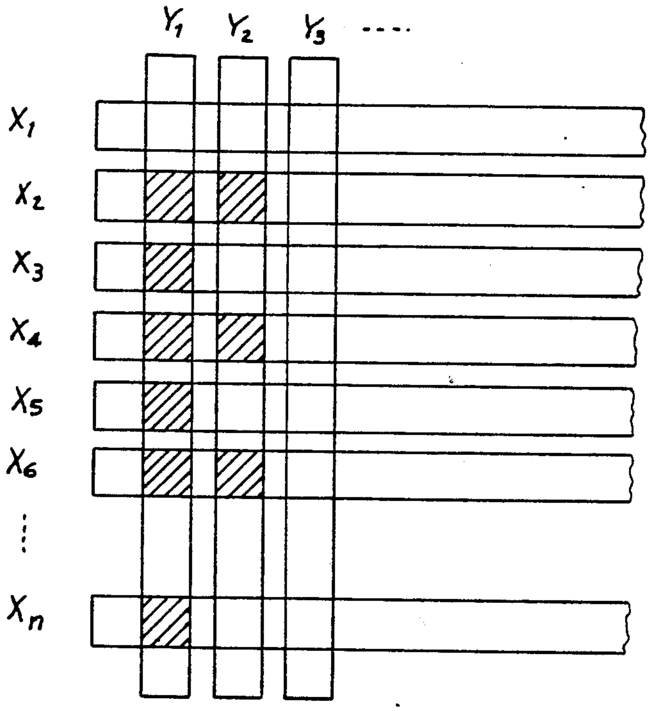
FIG. 19A shows the display pattern of liquid crystal elements in a portion of a liquid crystal display driven according to a first example of a fourth embodiment of the invention.
Figure 19B:
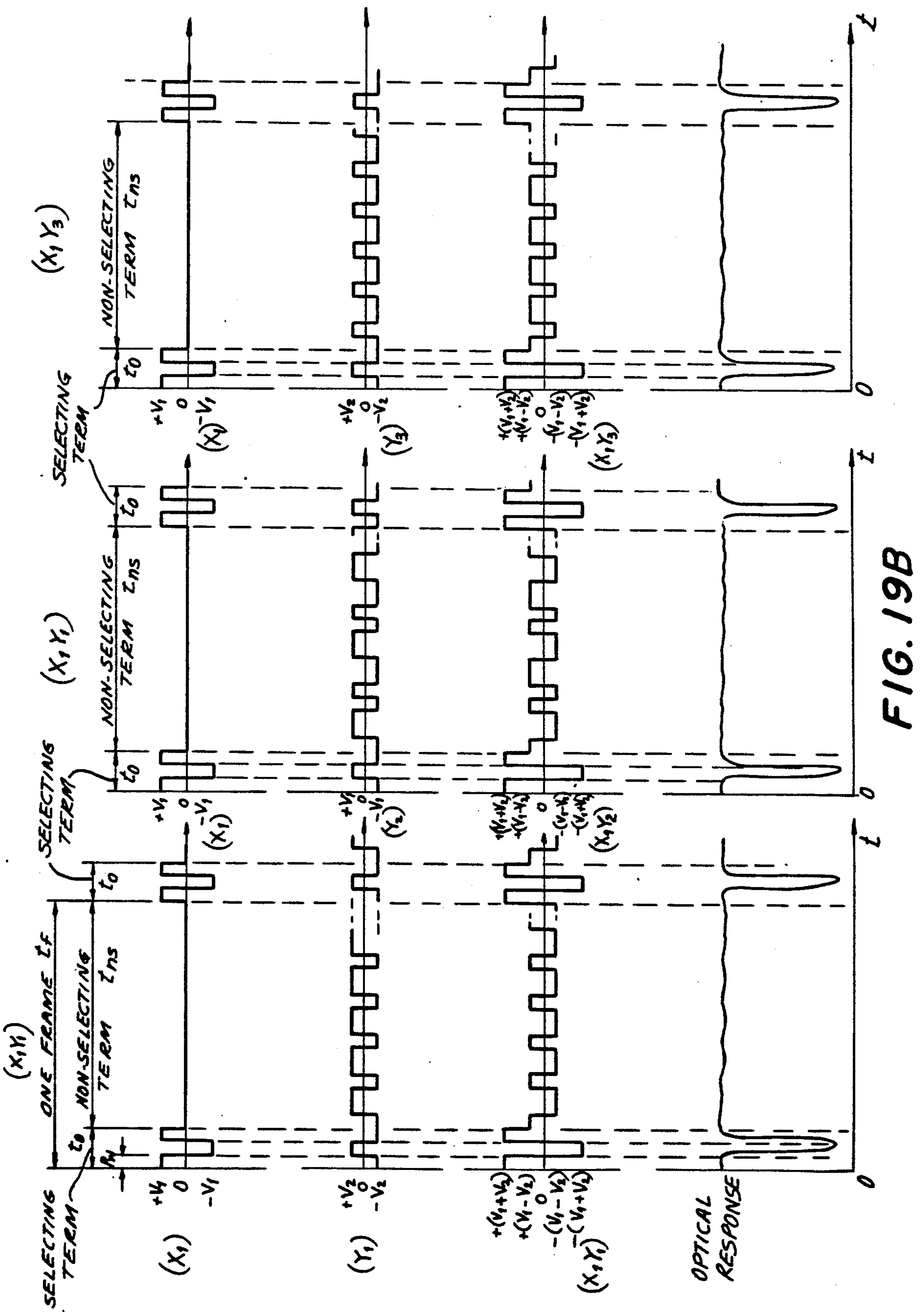
FIGS. 19B and 19C illustrate the driving waveforms and optical response of the liquid crystal elements of FIG. 19A.
Figure 19C:
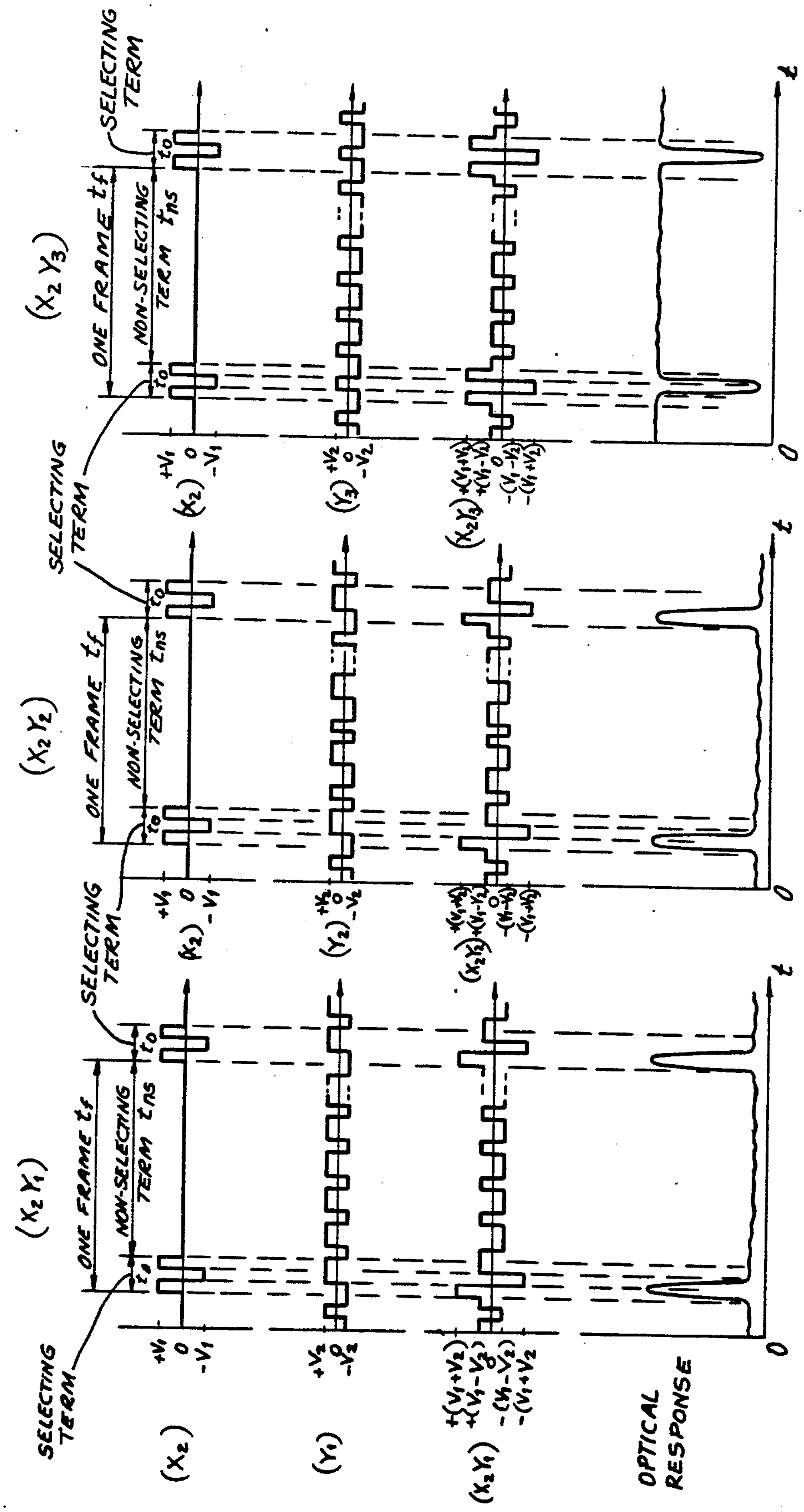

FIGS. 19A, 19B and 19C illustrate a first example of the fourth embodiment of the invention. FIG. 19A shows three different display patterns of a liquid crystal display device. The waveforms apply to the common and segment electrodes $X_i$ and $Y_j$ ($i=1,2,3\ldots, j=1,2,3\ldots$,) and the optical response of the pixels or picture elements $(X_i,Y_j)$ are illustrated in FIGS. 19B and 19C. Three voltage pulses having amplitudes alternating between $V_1=10$ volts and $-V_1=-10$ volts are applied to the common electrode X. The width $P_w$ of these pulses is 100 μsec and the pulses are applied in the order positive, negative and positive during selecting term $t_o$. In a non-selecting term, no voltage is applied to the common electrode. Electric field pulses of amplitude $V_2$ having the opposite polarity to that of the pulses applied to the common electrode, for example $V_2=5$ volts, are applied to the segment electrode Y. These pulses may be applied in the order of negative, positive and negative. Alternatively, the order may be negative, positive and positive; or in other words a negative pulse followed by a positive pulse having twice the width of the negative pulse. The polarity of the last pulse of the three pulses determines whether the picture element will be on or off. The optical responses obtained for various input waveforms are shown in FIGS. 19B and 19C. The light transmittance determined in the selecting term does not change in the non-selecting term. Furthermore, according to this embodiment, an electric field pulse having a polarity opposite to that which causes the desired display state is applied momentarily in the selecting term and momentarily inverts the display contents. However, immediately thereafter, the electric field pulse for the desired display state is applied and the desired displayed contents are memorized so that the inverted display is not perceived by the observer.

Figure 20:
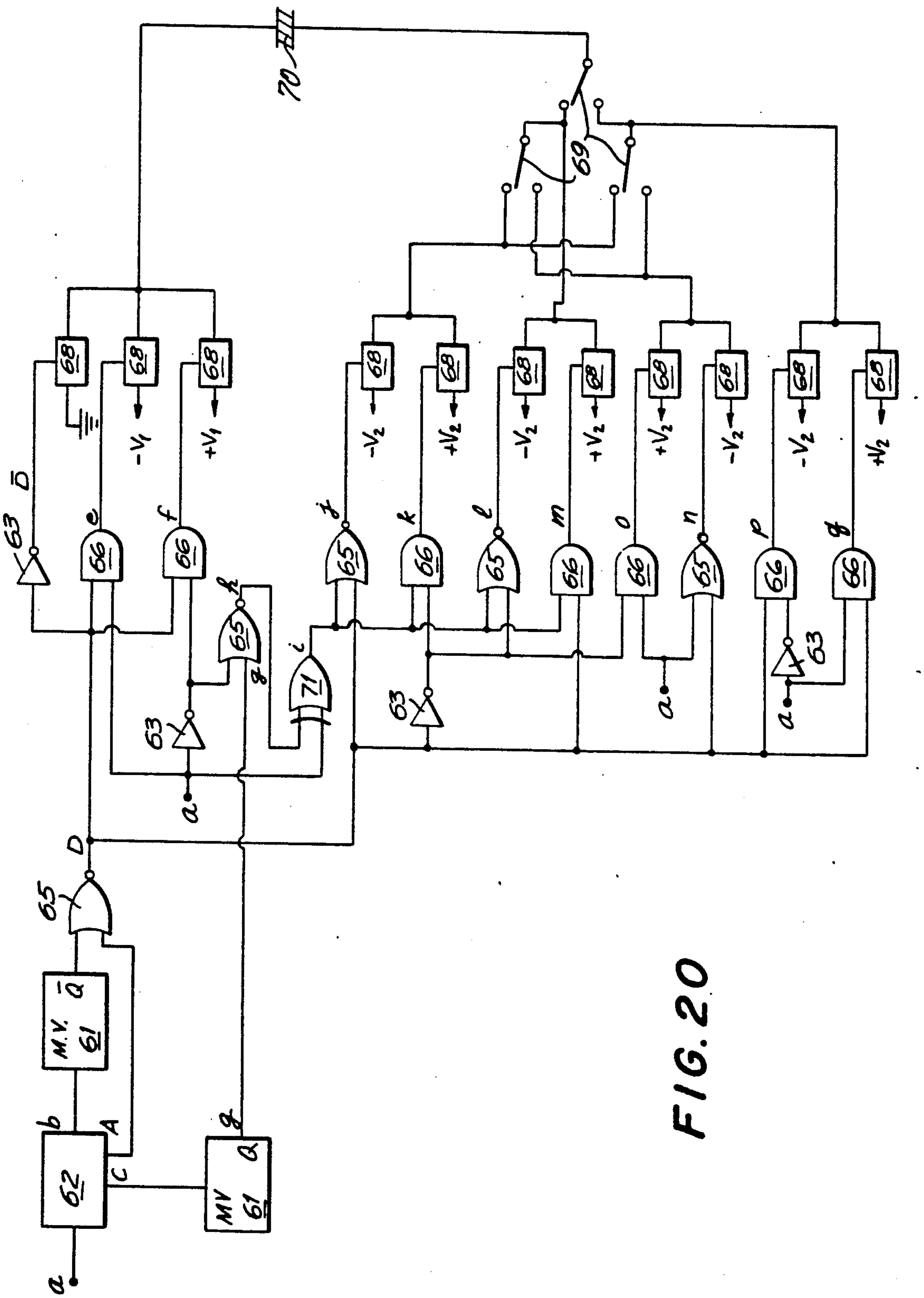
FIG. 20 is a schematic diagram of a circuit for generating a driving waveform of the type shown in FIG. 19.
Figure 21:
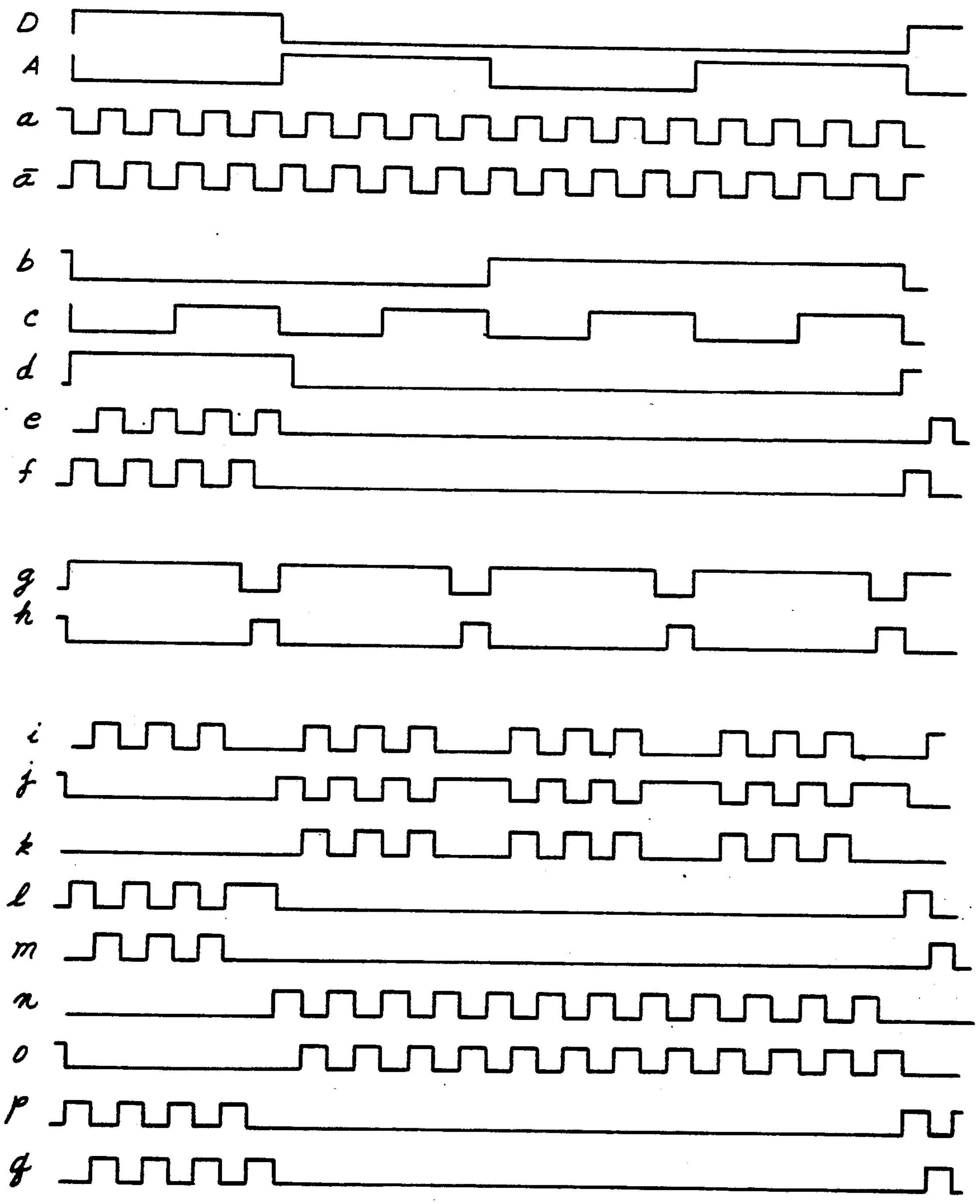
FIG. 21 is a timing diagram of waveforms of signals in the circuit shown in FIG. 20.

FIG. 20 is a schematic diagram of one example of a circuit for generating the driving waveforms for the liquid crystal as shown in FIGS. 19B and 19C. Waveforms at various points in the circuit of FIG. 20 are shown in FIG. 21. Square wave signal a is applied to counter 62 which is configured to produce outputs b, A and c which are related to input a in that they are divided by 16, 8 and 4 respectively. Signal a is also supplied to a first input of exclusive OR gate 71. The second input of exclusive OR gate 71 is provided by the output signal D of a NOR gate 65. Signal a is also applied to two inverters 63 and the two AND gates 66 which provide signals e and o as well to a NOR gate 65 which provides output signal n. Signals $\bar{D}$, e, and f are applied to control inputs of a series of three transmission gates 68 connected respectively to ground, $-V_1$ and $+V_1$ and actuate these three transmission gates 68 to produce the waveform applied to the common electrode of liquid crystal device 70. Signals j, k, l, m, n, o, p and q are applied to control inputs of a series of eight transmission gates 68 to selectively apply voltages $+V_2$ and $-V_2$ to a group of three switches 69 which although shown as mechanical switches are actually intended to be electronic switches. Switches 69 are selectively operated to produce waveforms as shown in FIG. 19 for application to a segment electrode of an element of liquid crystal device 70.

Figure 22:
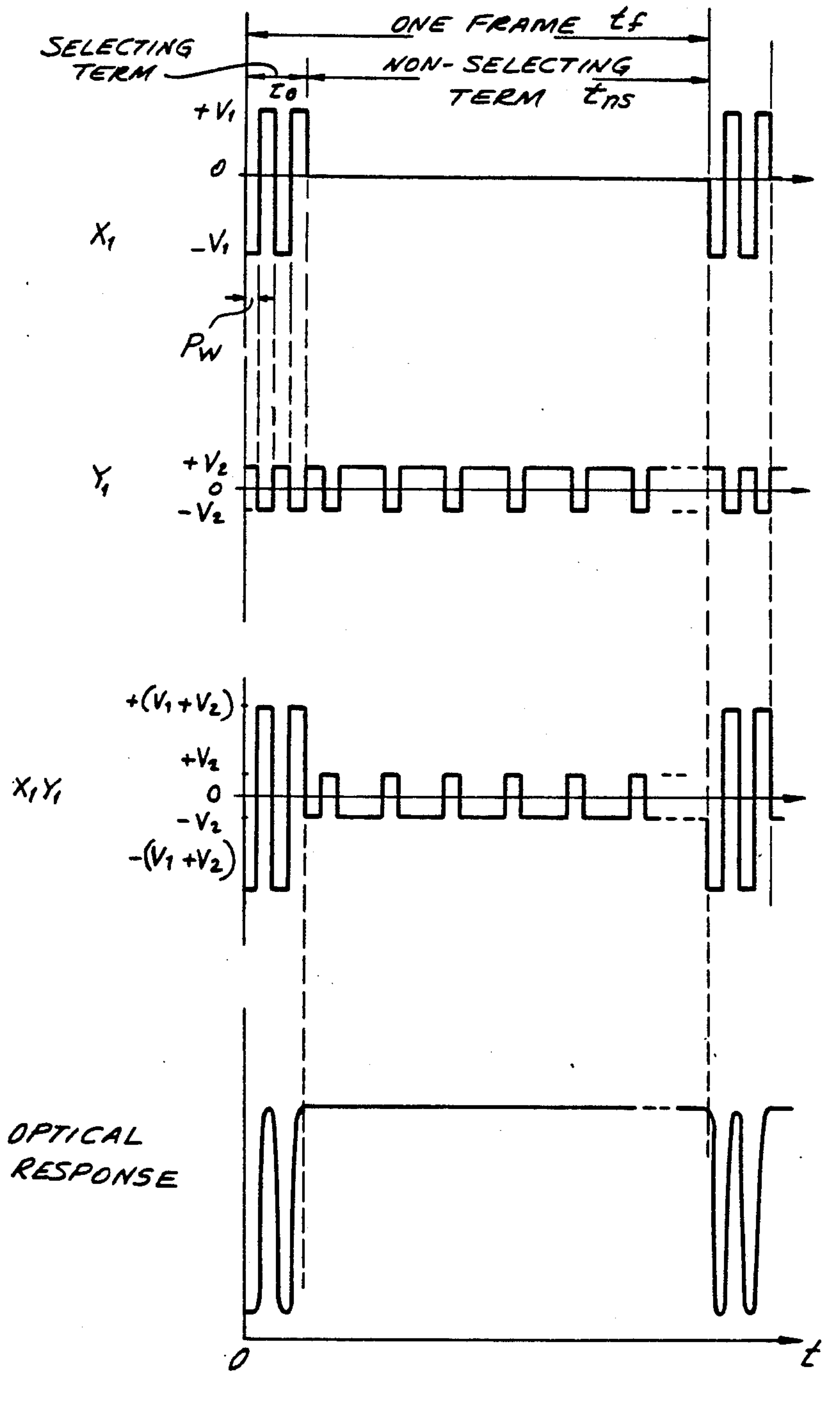
FIG. 22 illustrates driving waveforms and optical response in accordance with a second example of the fourth embodiment of the invention.

FIG. 22 illustrates driving waveforms and optical response for a second example of the fourth embodiment of the invention. The displayed pattern corresponds to what is shown in FIG. 19A. The picture element $(X_1,Y_1)$ is on and other picture elements $(X_n,Y_1)$ on the segment electrode $Y_1$ are off. The optical response shown in FIG. 22 indicates the response of picture element $(X_1,Y_1)$. An electric field having a pulse amplitude $V_1=+24$ volts or $-24$ volts and a pulse width Pw of 30 μsec is applied to the common electrode during selecting term $t_s$ in the order of negative, positive, negative and positive. Thus, there are four pulses applied in a selecting term. However, no electric field is applied to the common electrode in non-selecting term $t_{ns}$. Electric field pulses of amplitude $V_2$, for example $V_2=8$ volts, corresponding in time to the positive and negative electric field pulses applied to the common electrode, are applied to the segment electrode. These pulses have a polarity opposite to that of the pulses applied to the common electrode and are applied in the order of positive, negative, positive and negative. Alternatively, these pulses may be applied in the order positive, negative, positive and positive. The polarity of the last pulse of the four pulses determines whether the picture element is on or off. The two momentary changes in optical state of the picture element shown in the optical response curve in FIG. 22 are not perceived by the observer and the optical response is excellent.

Figure 23:
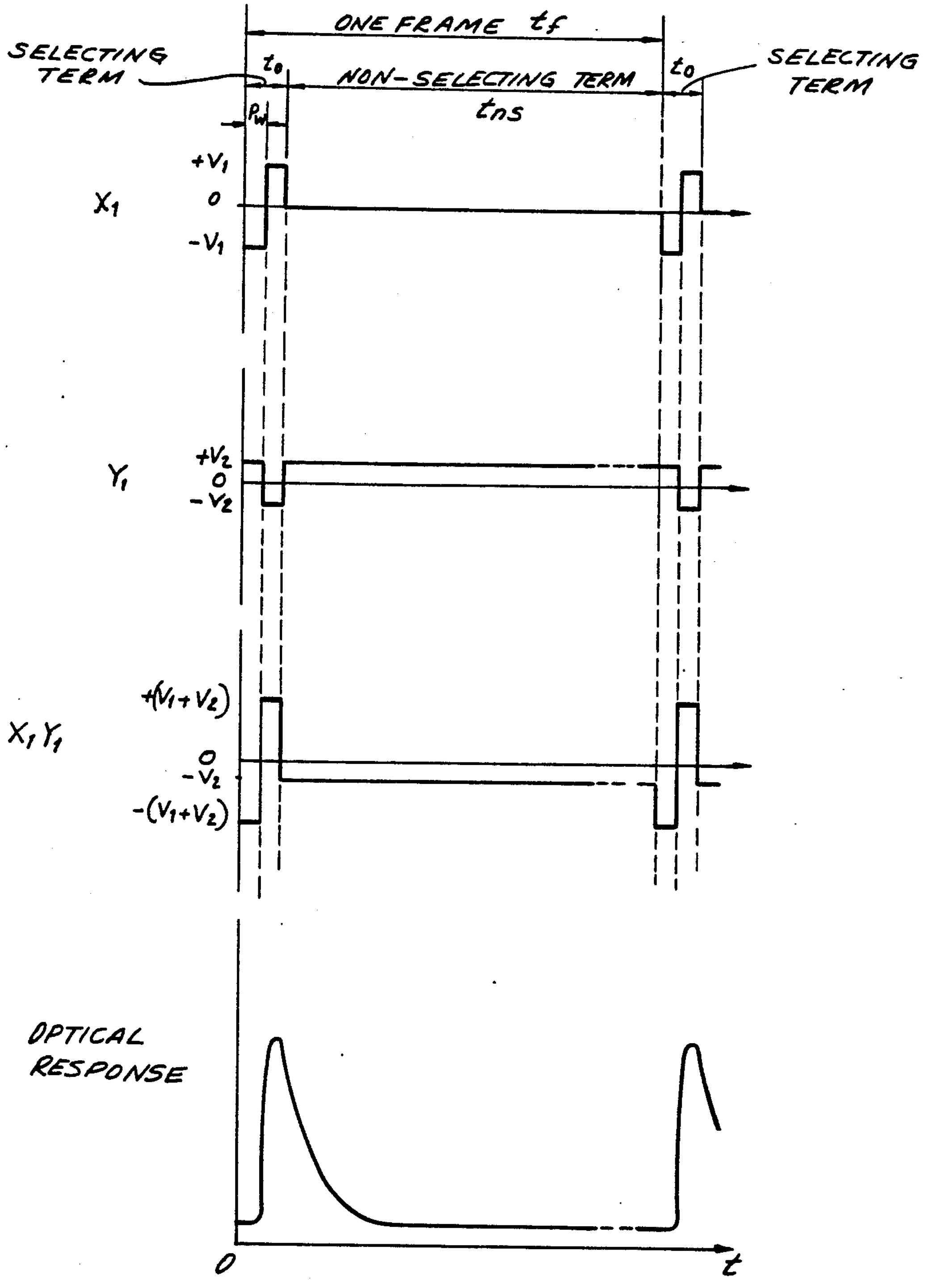
FIG. 23 shows driving waveforms and optical response for a driving method disclosed for purposes of comparison.

FIG. 23 merely illustrates a comparison example. A negative pulse having an amplitude $-V_1=10$ volts and a positive voltage pulse having an amplitude $+V_1=+10$ volts are applied to a common electrode. The pulse width Pw of these pulses is 100 μsec. These pulses are applied in a selecting term and no voltage is applied to the common electrode in a non-selecting term. Electric field pulses of amplitude $V_2$, for example $V_2=5$ volts, corresponding in time to the negative and positive electric field pulses applied to the common electrode are applied to a segment electrode. These pulses have polarities opposite to that of the pulses applied to the common electrode and are applied in the order of positive and negative or positive and positive. The polarity of the last pulse of the two pulses selects whether the picture element is on or off. If the picture element $(X_1,Y_1)$ shown in FIG. 19A is on and other picture elements on the segment electrode $Y_1$ are off, the light transmittance of picture element $(X_1,Y_1)$ changes in non-selecting term $t_{ns}$ as shown in FIG. 23 because the electric field pulse of amplitude $-5$ volts, which has a long pulse width, and therefore a large area or energy content, is applied during the non-selecting term.

In a fifth embodiment of a driving method according to the invention the following conditions are satisfied:

1. At least four electric field pulses having positive and negative amplitudes of $+V_1$ and $-V_1$ respectively are applied to a common electrode during a selecting term, while no voltage is applied to the common electrode in a non-selecting term.

2. Electric field pulses of amplitude $V_2$ having pulse width and polarity which are the same as the pulses applied to the common electrode, and corresponding in time to the positive and negative electric field pulses applied to the common electrodes (except for two pulses at the end of the selecting term) are applied to a segment electrode.

3. A pulse of voltage $+V_2$ or $-V_2$, corresponding in width and time to the last two pulses of the selecting term applied to the common electrode are applied to the segment electrode. Whether the picture element is on or off is determined by selecting the polarity of the last pulse of voltage $Y_2$ applied to the segment electrode.

4. The following relationships are maintained:

$$V_1+V_2>V_{th}$$

$$V_1-V_2\leqq V_{th}$$

$$V_2\leqq V_{th}$$

$$V_1\geqq V_2$$

Figure 24A:
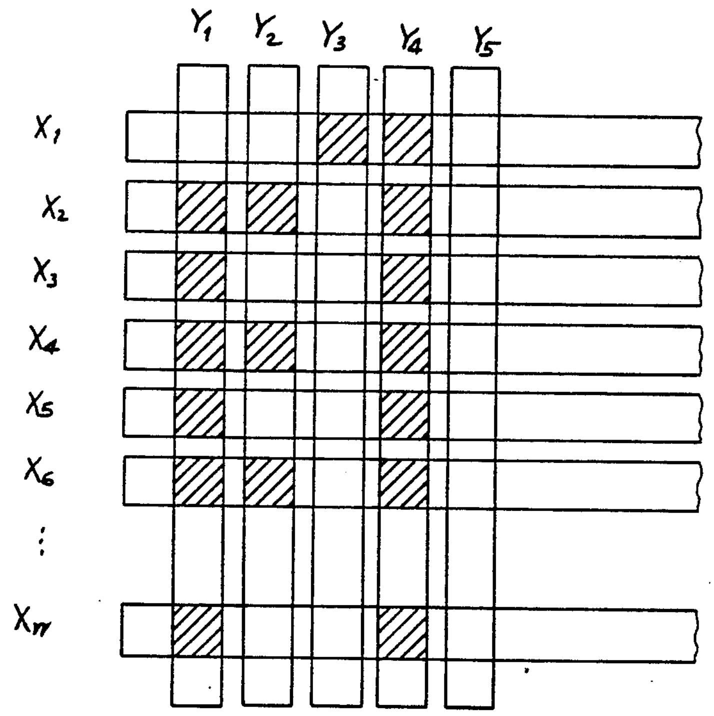

FIGS. 24A, 24B1 and 24B2 illustrate an example of the fifth embodiment of the invention. FIG. 24A is a portion of a liquid crystal display device showing five different display patterns. FIG. 24B1 and FIG. 24B2 show the waveforms applied to and the optical response from each of the five picture element on common electrode $X_1$.

In FIGS. 24B1 and 24B2, in order to indicate on and off (light and dark) states more clearly, waveforms which change the state of the picture element and the resulting optical response thereto of the picture elements $(X_1,Y_n)$ are illustrated in the second frame.

Electric field pulses of amplitude $+V_1$ and $-V_1$, where $V_1=6$ volts, and having a pulse width Pw of 200 μsec are applied to common electrode X in selecting term $t_o$ in order of positive, negative, positive and negative, so that four pulses are applied. No voltage is applied to common electrode X in non-selecting term $t_{ns}$. Electric field pulses of amplitude $+V_2$ and $-V_2$, for example $V_2=3$ volts, having the same polarity and pulse width as that of the pulses applied to the common electrodes are applied to segment electrode Y. These pulses correspond in time, amplitude and polarity to the first two positive and negative pulses applied to common electrode X in the selecting term $t_o$. Voltage $+V_2$(+3 volts) or $-V_2$ (−3 volts) is applied for the last 400 μsec, corresponding in time to the last two pulses applied to common electrode X in selecting term $t_o$. This last pulse applied to segment electrode Y in selecting term $t_o$, having a duration of 400 μsec, determines whether the picture element is on or off. If the picture element is switched on by applying a negative pulse, when −3 volts is applied, a voltage of +9 volts is applied to the liquid crystal layer in selecting term $t_o$ and the picture element is turned on. When +3 volts is applied, −9 volts is applied to the liquid crystal layer and the picture element is turned off. The resulting light transmittance is excellent as shown in FIG. 24B and 24C. The contrast ratio is approximately 1:15.

Figure 25:
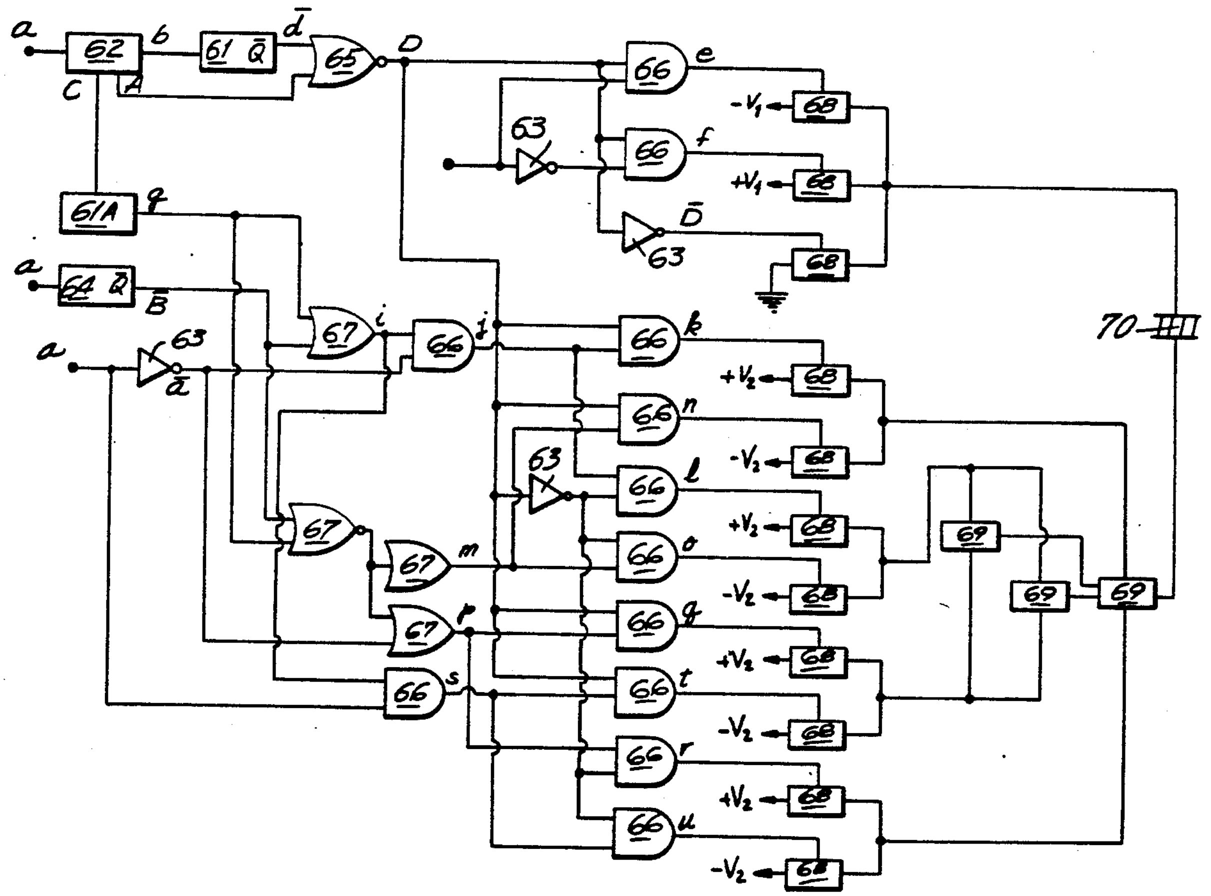
FIG. 25 is a schematic diagram of a circuit for generating driving waveforms as shown in FIG. 24.
Figure 26:
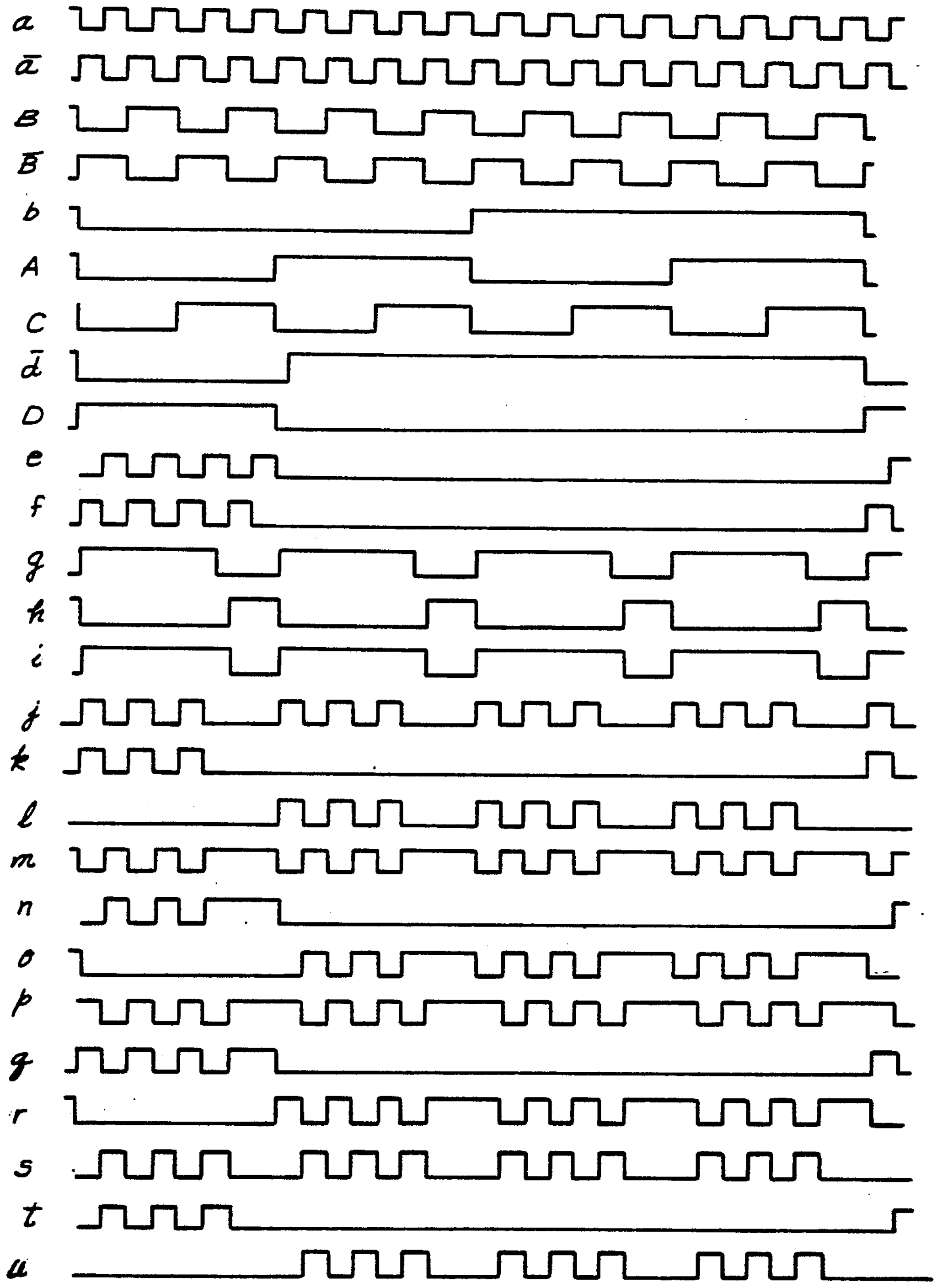
FIG. 26 is a timing diagram of the waveforms of signals in the circuit shown in FIG. 25.

FIG. 25 illustrates an example of a circuit for generating the driving waveforms shown in FIG. 24. FIG. 26 shows waveforms found at selected points in the circuit of FIG. 25. Square wave a is supplied to counter 62,to flip-flop 64, to two inverters 63 and two AND gate 66. Counter 62 is configured to provide outputs b, A and c which frequency divide of square wave a by 16, 8 and 4 respectively. Signal b is supplied to the input of oneshot multivibrator 61 while signal c is supplied to the input of oneshot multivibrator 61A. Oneshot 61 produces $\overline{Q}$ output signal $\overline{d}$ which is supplied to a NOR gate 65. In FIG. 25 AND gates are represented by 66, OR gates are represented by 67 and transmission gates are represented by 68. Switches 69 provide an output to the segment electrode of liquid crystal device element 70. Signals e, f, and $\overline{D}$, applied to the control inputs of three transmission gates 68 respectively, selectively activate these three transmission gates 68 to form the driving waveform for the common electrode. Signals k, n, l, o, q, t, r and u are applied to activate eight transmission gates 68 in a similar manner to form the driving waveform for the segment electrode. The precise form of the driving waveform applied to the segment electrode of liquid crystal device element 30 is determined by the manner in which switches 69 are selectively activated. The driving voltages selected are $+V_1$, $-V_1$, $+V_2$ and $-V_2$.

Figure 27:
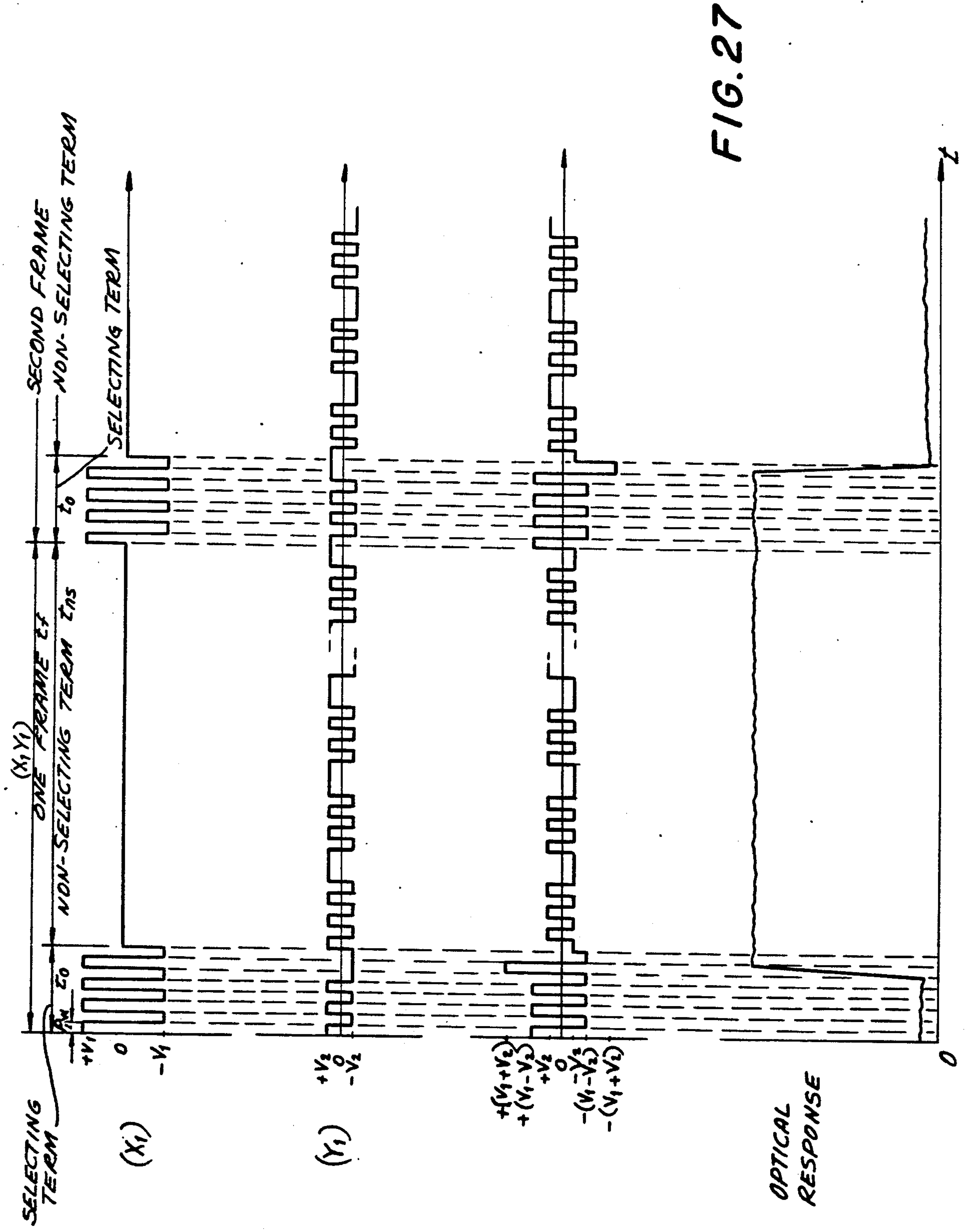
FIG. 27 illustrates driving waveforms and optical response in accordance with a second example of the fifth embodiment of the invention.

FIG. 27 illustrates the driving waveforms and optical response of another example of the fifth embodiment of the invention. The display pattern is that shown in FIG. 24A. Picture element $(X_1,Y_1)$ is turned on while the other picture elements on segment electrode $Y_1$ are turned off. FIG. 27 illustrates the waveforms applied to the picture element $(X_1,Y_1)$. In the second frame displayed in FIG. 27 the pulse which causes a change in state of the picture element is negative, as opposed to being positive in the first frame. Eight voltage pulses having amplitudes of $+V_1$ and $-V_1$, where $V_1$ is for example 12 volts, and a pulse width Pw of 50 μsec are applied to the common electrode repeating the sequence positive and negative, a total of four times during the selecting term $t_o$. No voltage is applied in non-selecting term $t_{ns}$. A waveform as illustrated in FIG. 27 and identified as $(Y_1)$ and having amplitudes of $+V_2$ and $-V_2$, where for example $V_2=4$ volts, is applied to the segment electrode. Therefore, as shown in the waveform identified as $(X_1,Y_1)$ in FIG. 27, in selecting term $t_o$, a pulse of +16 volts is more than the threshold at a pulse width of 50 μsec and a voltage of 8 volts is less than the threshold voltage at the same pulse width (see FIG. 2). In non-selecting term $t_{ns}$, a voltage of 4 volts applied to the liquid crystal layer is less than the threshold voltage. The optical response which is obtained, as shown in FIG. 27 is excellent. In this embodiment, one frame has a duration of 40 milliseconds.

The above mentioned embodiments and example are some of the possible driving method according to the present invention. The ratio of the amplitudes of the electric field pulses applied to the common electrode and the segment electrode can be optimumly selected in accordance with the characteristics of the threshold behavior of the liquid crystal material. In addition, liquid crystal materials other than DOBAMBC such as those represented in table 1 can be utilized according to the present invention.

In accordance with this invention, the light transmission state selected in a selecting term does not change in a non-selecting term, because an electric field pulse having an amplitude which exceeds the threshold value of the optical response of the ferroelectric liquid crystal is not applied in the non-selecting term, without regard or independently of the pattern displayed. Therefore, it is possible to apply the multiplex driving method according to the invention to a large-size high density display, an electronic shutter or the like.

It will thus be seen that the objects set forth above, among those made apparent from the preceding description, are efficiently attained and, since certain changes may be made in carrying out the above method and in the constructions set forth without departing from the spirit and scope of the invention, it is intended all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for driving a multielement liquid crystal display device having ferroelectric liquid crystal therein, the method comprising the steps of:
   - applying at least one selecting electric field pulse having an amplitude and pulse width which exceeds a threshold value of optical response of said ferroelectric liquid crystal to each element during a selecting term;
   - applying at least one non-selecting electric field pulse having an amplitude and pulse width which is not greater than the threshold value to each element during a non-selecting term; and
   - determining optical response of the ferroelectric liquid crystal in accordance the waveforms of at least one said selecting pulse and at least one said non-selecting pulse.

2. The method of claim 1, wherein said threshold value is determined in accordance with a waveform of said non-selecting pulse.

3. The method of claim 1, wherein said threshold value is determined in accordance with duration of said non-selecting pulse.

4. The method of claim 1, wherein said non-selecting pulse is of a width which is a small fraction of time between selecting terms.

5. The method of claim 1, wherein at least one of said selecting pulse and at least one said non-selecting pulse are of opposite polarity.

6. The method of claim 1, wherein at least one of said selecting pulses and at least one of said non-selecting pulses are of the same polarity.

7. The method of claim 1, wherein said non-selecting pulses are pulses having an amplitude which is smaller than the threshold value.

8. The method of claim 1, wherein first polarityselecting pulses change a condition of an element from a first state to a second state, and wherein second polarity selecting pulses return said element to said first state.

9. The method of claim 1, wherein said non-selecting pulses include a series of pulse trains of alternating polarity.

10. The method of claim 9, wherein said pulse trains include pulses of alternating polarity.

11. The method of claim 1, wherein said non-selecting pulses include a series of pulse trains of alternating polarity, said pulse trains being separated by intervals of time in which no electric field is applied to said element.

12. The method of claim 1, wherein said non-selecting pulses comprise a first wave train and a second wave train, said first wave train having pulses of a first polarity and said second wave train having pulses of a second polarity, said first wave train and said second wave train being alternately applied.

13. The method of claim 1, wherein a continuous series of non-selecting pulses is applied in said non-selecting term.

14. The method of claim 1, wherein a plurality of pulses of alternating polarity are applied to said element during said selecting term.

15. The method of claim 1, wherein periods of pulses applied during said selecting term are different from pulse to pulse.

16. The method of claim 1, wherein during said selecting term, first pulses of a first amplitude and polarity are applied to said element and pulses of a second amplitude and same polarity are applied to said element.

17. The method of claim 1, wherein at least one inverting electric field pulse having a polarity opposite to that which causes a first display state, is applied momentarily in said selecting term to momentarily invert said display state.

18. The method of claim 17, wherein said inverting electric field pulse is of a duration insufficient to be perceived by an observer.

19. A circuit for driving a multielement liquid crystal display having a first electrode and a second electrode and a crystal layer including a ferroelectric liquid crystal disposed between said first electrode and said second electrode, said first electrode, and said second electrode being for applying a driving electric field to said liquid crystal layer, the circuit comprising:

a first generating means for producing first pulses to be supplied to said first electrode;

a second generating means for generating second pulses to be applied to said second electrode;

said first pulses and said second pulses being combined across said liquid crystal layer to produce at least one selecting electric field pulse, during a selecting term, having an amplitude and a period which exceeds a threshold value of optical response of said ferroelectric liquid crystal layer; and at least one non-selecting electric field pulse, during a non-selecting term, having an amplitude and period which combined are less than the threshold value.

20. The circuit of claim 19 in which;

said first generating means comprises:

a divide by n circuit having an input for receiving a first timing signal including a first series of pulses and an output for providing a divided output signal of pulses at a frequency of 1/n the frequency of said first timing signal, a first pulse producing means for producing first output pulses in response to each pulse of said divided output signal, a second pulse producing means for producing second output pulses in response to each first output pulse;

a first AND gate having a first input for receiving said second output pulses and a second input for receiving a second timing signal fixed in phase with resepct to said first timing signal and having a frequency m times the frequency of said first timing signal, first application means for applying a first supply voltage to said first electrode in response to an output of said first AND gate;

a first inverter having a input for receiving said second timing signal and an output for providing a first inverted output signal which is a logical inverse of said second timing signal, a second AND gate having a first input for receiving said first inverted output signal and a second input for receiving said second output pulses;

second application means for applying a second supply voltage to said first electrode in response to an output of said supply AND gate;

a NOR gate having a first input for receiving said first output pulses and a second input for receiving said second output pulses;

third application means for applying a ground potential to said first electrode in response to an output of said NOR gate; and a fourth application means for applying a third supply voltage to said first electrode in response to said first output pulses; and in which said second generating means comprises:

a third pulse producing means for producing third output pulses in response to each pulse of said first timing signal, a third AND gate having a first input for receiving said second timing signal and a second input for receiving said third output pulses;

a fifth application means for applying a fourth supply voltage to said second electrode in response to an output of said third AND gate;

a fourth AND gate having a first input for receiving said third output pulses and a second input for receiving said inverted output signal;

a sixth application means for applying a fifth supply voltage to said second electrode in response to an output of said fourth AND gate;

a second inverter having an input for receiving said third output pulses and an output for providing a second inverted output signal which is the logical inverse of said third output pulses;

a seventh application means for applying a ground potential to said second electrode in response to an output of said second inverter means.

21. The circuit of claim 19 further comprising an input for receiving a data signal requiring a change in state of said liquid crystal and in which said first generating means comprises:

a divide by n circuit having an input for receiving a first timing signal including a first series of pulses and an output for providing a divided output signal of pulses at a frequency of 1/n the frequency of said timing signal, a first pulse producing means for producing first output pulses in response to each pulse of said divided output signal, a second pulse producing means for producing second output pulses in response to each first output pulse, said second output pulses being of a logic state opposite to said first output pulses, a first OR gate having a first input for receiving said second output pulses and a second input for receiving a second timing signal fixed in phase with respect to said first timing signal and having a frequency m times the frequency of said first timing signal, switching means responsive to said first output pulses and an output of said first OR gate for applying one of a first supply voltage, a second supply voltage and ground potential to said first electrode;

and in which said second generting means comprises:

a third pulse producing means for producing a third output pulse in response to each pulse of said first timing signal, an RS flip-flop having a set input for receiving said data pulses and a reset input for receiving said third output pulses said RS flip-flop having a first logic output and a second logic output, the second logic output being logical opposite of said first logic output, an AND gate having a first input for receiving said first output of said RS flip-flop and a second input for receiving said second timing signal, a second OR gate having a first input for receiving said second output of said RS flip-flop, and a second input for receiving said second timing signal; and second switching means responsive to an output of said AND gate and an output of said second OR gate for supplying one of a first supply voltage, a second supply voltage and ground potential to said second electrode.

22. The circuit of claim 19 in which said first generating means comprises:

a divide by n circuit having an input for receiving a timing signal including a first series of pulses, said divide by n circuit providing two divided output signals, said first divided output signal having a frequency of $1/n_1$ the frequency of said timing signal, and said second divided output signal having a frequency of $1/n_2$ the frequency of said timing signal, said first divided output signal having a frequency lower than that of said second divided output signal, a first pulse producing means for producing first output pulses in response to each pulse of said first divided output signal, a first application means for applying a first supply voltage to said first electrode in response to said first output pulses, a second pulse producing means for producing second output pulses in response to each first output pulse;

a second application means for applying a second supply voltage to said first electrode in response to said second output pulses, a first NOR gate having a first input for receiving said first output pulses and a second input for receiving said second output pulses, an AND gate having a first input for receiving an output of said first NOR gate and a second input for receiving said timing signal;

a third application means for applying a third supply voltage to said first electrode in response to an output of said AND gate;

a first inverter having an input for receiving the output of said first NOR gate, a second NOR gate having a first input for receiving an output of said first inverter and a second input for receiving said timing signal; and a forth application means for applying a fourth supply voltage to said first electrode in response to an output of said second NOR gate;

and in which said second generating means comprises:

a fifth application means for applying said third supply voltage to said second electrode in response to said second divided output pulses, a second inverter having an input for receiving said second divided output signal, a sixth application means for applying said fourth supply voltage to said second electrode in response to an output of said second inverter.

23. The circuit of claim 19 in which said first generating means comprises:

a divide by n circuit having an input for receiving a timing signal including a first series of pulses, said divide by n circuit providing three divided output signals, said first divided output signal having a frequency of $1/n_1$ the frequency of said first timing signal, said second divided output signal having a frequency of $1/n_2$ the frequency of said first timing signal, and said third divided output signal having a frequency of $1/n_3$ the frequency of said first timing signal, said first divided output signal having a frequency smaller than that of said second divided output signal, and said second divided output signal having a frequency smaller than that of said third divided output signal, a first pulse producing means for producing first output pulses in response to each pulse of said first divided output signal, said pulses being the logical opposite of pulses of said first divided output signal, a first NOR gate having a first input for receiving said first output pulses and a second input for receiving said second divided output pulses, a first inverter responsive to an output of said first NOR gate, a first application means for connecting said first electrode to ground potential in response to an output from said first inverter, a first AND gate having a first input for receiving said output of said first NOR gate and a second input for receiving said timing signal, a second application means for applying a first supply voltage to said first electrode in response to an output of said first AND gate;

a second inverter having an input for receiving said timing signal;

a second AND gate having a first input for receiving said output of said first NOR gate, and a second input for receiving an output of said second inverter, and a third application means for applying a second supply voltage to said first electrode in response to an output from said second AND gate.

* * * * *

Notice of Adverse Decisions in Interference

In Interference No. 102,090, involving Patent No. 4,701,026, M. Yazaki, Y. Sato, METHOD AND CIRCUITS FOR DRIVING A LIQUID CRYSTAL DISPLAY DEVICE, final judgment adverse to the patentees was rendered July 2, 1991, as to claims 1-8, 12-16 and 19-23.

(*Official Gazette August 27, 1991*)